US011627474B2

(12) United States Patent
Yanagisawa et al.

(10) Patent No.: US 11,627,474 B2
(45) Date of Patent: Apr. 11, 2023

(54) BASE STATION, TERMINAL APPARATUS, METHOD, PROGRAM, AND RECORDING MEDIUM

(71) Applicant: NEC CORPORATION, Tokyo (JP)

(72) Inventors: Takahiro Yanagisawa, Tokyo (JP); Shizen Sasaki, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 16/475,227

(22) PCT Filed: Dec. 8, 2017

(86) PCT No.: PCT/JP2017/044116
§ 371 (c)(1),
(2) Date: Jul. 1, 2019

(87) PCT Pub. No.: WO2018/128048
PCT Pub. Date: Jul. 12, 2018

(65) Prior Publication Data
US 2019/0342766 A1    Nov. 7, 2019

(30) Foreign Application Priority Data
Jan. 5, 2017   (JP) .............................. JP2017-000703

(51) Int. Cl.
*H04W 16/28*  (2009.01)
*H04W 72/04*  (2023.01)
*H04W 72/044* (2023.01)

(52) U.S. Cl.
CPC ......... *H04W 16/28* (2013.01); *H04W 72/042* (2013.01); *H04W 72/046* (2013.01)

(58) Field of Classification Search
CPC ..... H04W 16/24; H04W 16/28; H04W 72/04; H04W 72/0406; H04W 72/0413;
(Continued)

(56) References Cited

U.S. PATENT DOCUMENTS

2007/0135172 A1   6/2007  Lysejko et al.
2008/0198793 A1*  8/2008  Lysejko .............. H04B 7/0851
                                                          370/328
(Continued)

FOREIGN PATENT DOCUMENTS

CN    102783201 A    11/2012
CN    103733542 A    4/2014
(Continued)

OTHER PUBLICATIONS

3GPP technical document R1-1612347, Ericsson, "On robust beam management", 3GPP TSGRAN WG1 Meeting #87, Reno, USA, Nov. 14-18, 2016, 3 pages.
(Continued)

*Primary Examiner* — Kevin D Mew

(57) ABSTRACT

In order to enable a terminal apparatus to identify a beam to be used by a base station, while reducing radio resource use, a base station 100 of the present invention includes: an information obtaining section 131 configured to obtain obtainable information obtainable for both the base station 100 and a terminal apparatus 200, the obtainable information being neither communication quality information nor an identifier indicating a transmit beam for transmission to the terminal apparatus 200; and a beam selecting section 133 configured to select a transmit beam for transmission to the terminal apparatus 200, from among a plurality of candidate transmit beams, based on the obtainable information.

11 Claims, 15 Drawing Sheets

(58) Field of Classification Search
CPC ............. H04W 72/042; H04W 72/044; H04W 72/0446; H04W 72/046
See application file for complete search history.

(56) References Cited

U.S. PATENT DOCUMENTS

| | | | |
|---|---|---|---|
| 2010/0118839 A1* | 5/2010 | Malladi | H04L 27/261 370/336 |
| 2011/0205969 A1 | 8/2011 | Ahmad et al. | |
| 2013/0039345 A1* | 2/2013 | Kim | H04W 72/0413 370/332 |
| 2013/0336157 A1* | 12/2013 | Tidestav | H04W 28/06 370/252 |
| 2013/0336176 A1* | 12/2013 | Rubin | H04B 7/26 370/280 |
| 2014/0098912 A1* | 4/2014 | Yin | H04B 7/088 375/345 |
| 2014/0146782 A1* | 5/2014 | Gerlach | H04W 72/042 370/329 |
| 2014/0211731 A1 | 7/2014 | Inoue et al. | |
| 2014/0293770 A1* | 10/2014 | Liu | H04L 5/001 370/216 |
| 2015/0327244 A1* | 11/2015 | Pajukoski | H04L 5/0003 370/330 |
| 2015/0349866 A1* | 12/2015 | Benjebbour | H04W 72/042 370/329 |
| 2016/0029358 A1* | 1/2016 | Hou | H04W 74/0833 370/329 |
| 2016/0219611 A1* | 7/2016 | Jo | H04W 72/1231 |
| 2016/0227575 A1* | 8/2016 | Furuskog | H04W 16/28 |
| 2016/0337916 A1* | 11/2016 | Deenoo | H04W 36/0088 |
| 2016/0360463 A1* | 12/2016 | Kim | H04W 36/30 |
| 2017/0094531 A1 | 3/2017 | Kakishima et al. | |
| 2017/0111886 A1* | 4/2017 | Kim | H04W 48/14 |
| 2017/0149480 A1* | 5/2017 | Kakishima | H04B 7/024 |
| 2017/0181134 A1* | 6/2017 | Niu | H04B 17/318 |
| 2017/0231011 A1* | 8/2017 | Park | H04W 72/0446 |
| 2017/0339662 A1* | 11/2017 | Lin | H04W 24/10 |
| 2018/0007679 A1* | 1/2018 | Lee | H04B 7/0695 |
| 2018/0027522 A1* | 1/2018 | Lee | H04W 72/0413 370/336 |
| 2018/0109971 A1 | 4/2018 | Takeda et al. | |
| 2018/0191422 A1* | 7/2018 | Xia | H04B 7/0695 |
| 2018/0192371 A1* | 7/2018 | Jung | H04W 68/02 |
| 2018/0241452 A1* | 8/2018 | Akkarakaran | H04B 7/088 |
| 2018/0278310 A1* | 9/2018 | Lee | H04B 7/0632 |
| 2018/0323856 A1* | 11/2018 | Xiong | H04L 1/16 |
| 2018/0368126 A1* | 12/2018 | Islam | H04L 5/0053 |
| 2020/0118544 A1* | 4/2020 | Lee | G10L 15/063 |

FOREIGN PATENT DOCUMENTS

| | | |
|---|---|---|
| CN | 106105292 A | 11/2016 |
| JP | 2001-512631 A | 8/2001 |
| JP | 2013-520937 A | 6/2013 |
| WO | 2013/024852 A1 | 2/2013 |
| WO | 2016/163508 A1 | 10/2016 |

OTHER PUBLICATIONS

3GPP technical document R1-1612641, InterDigital Communications, "Considerations on Beam Recovery for NR", 3GPP TSG-RAN WG1 Meeting #87, Reno, USA, Nov. 14-18, 2016, 3 pages.
3GPP technical document R1-1610239, Nokia, Alcatel-Lucent Shanghai Bell, "On beam management in NR—procedures", 3GPP TSG-RAN WG1 Meeting #86bis, Lisbon, Portugal, Oct. 10-14, 2016; 4 pages.
3GPP technical document R1-1611386, CATT, "Beamforming for data and control channel", 3GPP TSG-RAN WG1 Meeting #87, Reno, USA, Nov. 14-18, 2016; 4 pages.
International Search Report for PCT/JP2017/044116 dated Feb. 20, 2018 {PCT/ISA/210}.
Nokia et al., "Beam Recovery in NR", 3GPP TSG-RAN WG2 Meeting #96, R2-167713, Nov. 14-18, 2016, (4 pages total).
Written Opinion of the International Searching Authority dated Feb. 20, 2018, in International Application No. PCT/JP2017/044116.
Communication dated Dec. 10, 2019, from the European Patent Office in application No. 17889661.9.
Office Action dated Aug. 24, 2021 for CN201780082021.4.
Chinese Office Communication for CN Application No. 201780082021.4 dated Nov. 2, 2022 with English Translation.

* cited by examiner

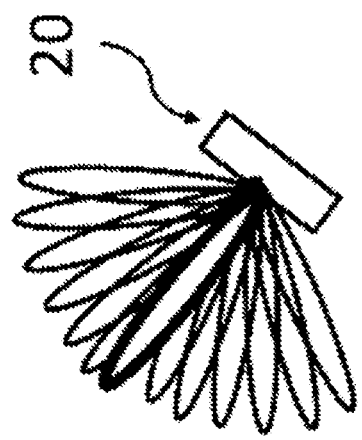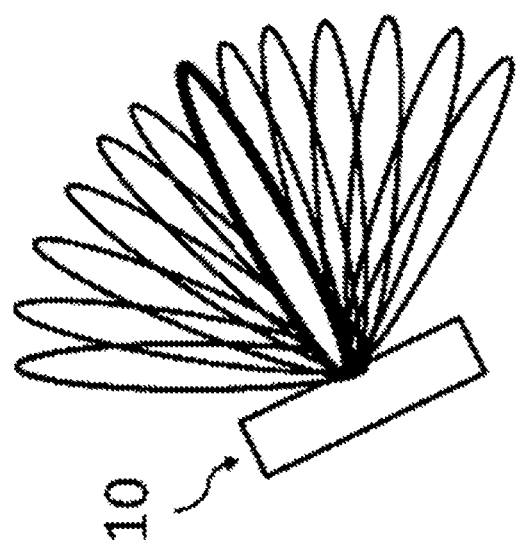
Fig. 1

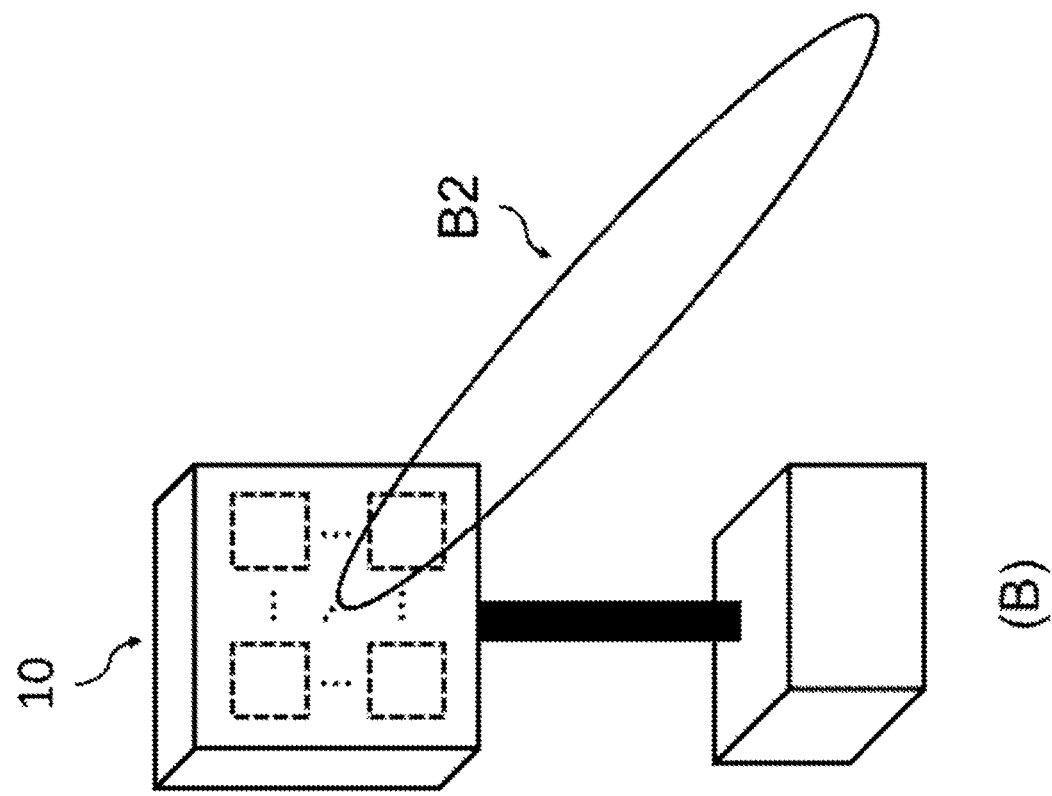
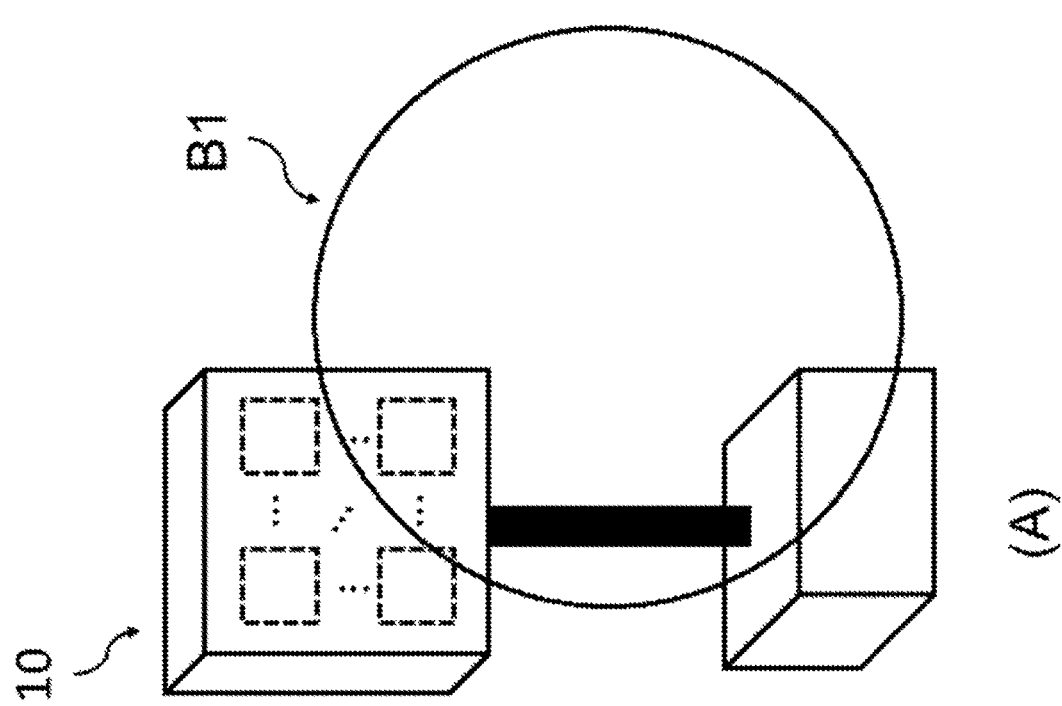
Fig. 2

BASE STATION, TERMINAL APPARATUS, METHOD, PROGRAM, AND RECORDING MEDIUM

CROSS REFERENCE TO RELATED APPLICATIONS

This application is a National Stage of International Application No. PCT/JP2017/044116 filed Dec. 8, 2017, claiming priority based on Japanese Patent Application No. 2017-000703 filed Jan. 5, 2017.

BACKGROUND

Technical Field

The present invention relates to a base station, a terminal apparatus, a method, a program, and a recording medium that relate to data transmission and/or reception via a radio access network.

Background Art

Discussion is being conducted about transmitting data to a distant terminal apparatus with high gain by a base station performing beamforming in a high frequency band, in a system conforming to fifth-generation (5G) standards in Third Generation Partnership Project (3GPP). In a case of performing beamforming, a terminal apparatus, for example, forms a suitable receive beam that improves reception quality for a transmit beam from a base station. For example, NPL 1 and NPL 2 describe that a plurality of pairs of a transmit beam and a receive beam (also referred to as beam pairs) are managed by both a base station and a terminal, to thereby improve robustness against blocking or the like that can occur in the beam pairs.

As a technique for forming a suitable receive beam described above, NPL 3, for example, describes that a base station transmits a reference signal by using a plurality of transmit beams to allow a terminal apparatus to adjust a receive beam so that reception quality for each transmit beam would be optimal, and then measures reception quality of each transmit beam. NPL 3 also describes that the terminal apparatus selects N preferable transmit beams, based on a result of the measurement of the reception quality and feeds transmit beam identifiers (and reception quality and the like optionally) back to a base station side. As a result of this, in the technique described in NPL 3, the base station holds N transmit beam identifiers for each terminal apparatus. The terminal apparatus similarly holds N transmit beam identifiers and further holds information related to a receive beam suitable for each transmit beam. In this way, information related to a plurality of transmit beams (transmit beam identifiers, reception quality, and the like) can be shared in advance between the base station and the terminal apparatus.

In addition, a discussion is being conducted about using, in a case of performing beamforming, different transmit beams for physical downlink control channel (PDCCH), which is a physical channel used for transmission of control information and the like, and physical downlink shared channel (PDSCH), which is a physical channel used for transmission of data and the like. As an example, NPL 4 describes using different beams for PDCCH and PDSCH.

CITATION LIST

Patent Literature

[NPL 1] 3GPP technical document R1-1612347, Ericsson, "On robust beam management", 3GPP TSG-RAN WG1 Meeting #87, Reno, USA, 14-18 Nov. 2016

[NPL 2] 3GPP technical document R1-1612641, InterDigital Communications, "Considerations on Beam Recovery for NR", 3GPP TSG-RAN WG1 Meeting #87, Reno, USA, 14-18 Nov. 2016

[NPL 3] 3GPP technical document R1-1610239, Nokia, Alcatel-Lucent Shanghai Bell, "On beam management in NR-procedures", 3GPP TSG-RAN WG1 Meeting #86 bis, Lisbon, Portugal, 10-14 Oct. 2016

[NPL 4] 3GPP technical document R1-1611386, CATT, "Beamforming for data and control channel", 3GPP TSG-RAN WG1 Meeting #87, Reno, USA, 14-18 Nov. 2016

SUMMARY

Technical Problem

In the above-described case of performing beamforming, the terminal apparatus needs to promptly identify a transmit beam to be used by the base station for the following reason, for example.

Specifically, if an instantaneous failure (link failure) has occurred in a transmit beam from the base station, in other words, if a transmit beam does not reach the terminal apparatus in a sufficient level, the base station needs to promptly switch the transmit beam. Upon such switching, the terminal apparatus needs to promptly identify a transmit beam.

For example, by the base station transmitting an identifier of the transmit beam to the terminal apparatus in control information, such as downlink control information (DCI), the terminal apparatus is able to promptly identify the transmit beam.

However, using control information, such as DCI, described above may use a lot of radio resources. In other words, this may cause an increase in overhead.

In view of these, an example object of the present invention is to enable a terminal apparatus to identify a beam to be used by a base station while reducing radio resource use.

Solution to Problem

A first base station of the present invention includes: an information obtaining section configured to obtain obtainable information obtainable for both the base station and a terminal apparatus, the obtainable information being neither communication quality information nor an identifier indicating a transmit beam for transmission to the terminal apparatus; and a beam selecting section configured to select a transmit beam for transmission to the terminal apparatus, from among a plurality of candidate transmit beams, based on the obtainable information.

A first terminal apparatus of the present invention includes: an information obtaining section configured to obtain obtainable information obtainable for both a base station and the terminal apparatus, the obtainable information being neither communication quality information nor an identifier indicating a transmit beam for transmission to the terminal apparatus; and a beam identifying section configured to identify a transmit beam for transmission to the terminal apparatus, the transmit beam being selected by the base station, from among a plurality of candidate transmit beams, based on the obtainable information.

A first method of the present invention includes: obtaining obtainable information obtainable for both a base station and a terminal apparatus, the obtainable information being neither communication quality information nor an identifier indicating a transmit beam for transmission to the terminal apparatus; and selecting a transmit beam for transmission to the terminal apparatus, from among a plurality of candidate transmit beams, based on the obtainable information.

A second method of the present invention includes: obtaining obtainable information obtainable for both a base station and a terminal apparatus, the obtainable information being neither communication quality information nor an identifier indicating a transmit beam for transmission to the terminal apparatus; and identifying a transmit beam for transmission to the terminal apparatus, the transmit beam being selected by the base station, from among a plurality of candidate transmit beams, based on the obtainable information.

A first program of the present invention is a program causing a processor to execute: obtaining obtainable information obtainable for both a base station and a terminal apparatus, the obtainable information being neither communication quality information nor an identifier indicating a transmit beam for transmission to the terminal apparatus; and selecting a transmit beam for transmission to the terminal apparatus, from among a plurality of candidate transmit beams, based on the obtainable information.

A second program of the present invention is a program causing a processor to execute: obtaining obtainable information obtainable for both a base station and a terminal apparatus, the obtainable information being neither communication quality information nor an identifier indicating a transmit beam for transmission to the terminal apparatus; and identifying a transmit beam for transmission to the terminal apparatus, the transmit beam being selected by the base station from among a plurality of candidate transmit beams, based on the obtainable information.

A first recording medium of the present invention is a non-transitory computer-readable recording medium having recorded thereon a program causing a processor to execute: obtaining obtainable information obtainable for both a base station and a terminal apparatus, the obtainable information being neither communication quality information nor an identifier indicating a transmit beam for transmission to the terminal apparatus; and selecting a transmit beam for transmission to the terminal apparatus, from among a plurality of candidate transmit beams, based on the obtainable information.

A second recording medium of the present invention is a non-transitory computer-readable recording medium having recorded thereon a program causing a processor to execute: obtaining obtainable information obtainable for both a base station and a terminal apparatus, the obtainable information being neither communication quality information nor an identifier indicating a transmit beam for transmission to the terminal apparatus; and identifying a transmit beam for transmission to the terminal apparatus, the transmit beam being selected by the base station, from among a plurality of candidate transmit beams, based on the obtainable information.

A second base station of the present invention includes: an information obtaining section configured to obtain indication information indicating use of a transmit beam selection technique out of a plurality of transmit beam selection techniques for selecting a transmit beam for transmitting a signal to a terminal apparatus; and a transmission processing section configured to transmit the indication information to the terminal apparatus.

A second terminal apparatus of the present invention includes: a reception processing section configured to receive, from a base station, indication information indicating use of a transmit beam selection technique out of a plurality of transmit beam selection techniques for the base station to select a transmit beam for transmitting a signal to the terminal apparatus; and a beam selecting section configured to identify a transmit beam selected by the base station, based on the indication information.

A third method of the present invention includes: obtaining indication information indicating use of a transmit beam selection technique out of a plurality of transmit beam selection techniques for selecting a transmit beam for transmitting a signal to a terminal apparatus; and transmitting the indication information to the terminal apparatus.

A fourth method of the present invention includes: receiving, from a base station, indication information indicating use of a transmit beam selection technique out of a plurality of transmit beam selection techniques for the base station to select a transmit beam for transmitting a signal to the terminal apparatus; and identifying a transmit beam selected by the base station, based on the indication information.

A third program of the present invention is a program causing a processor to execute: obtaining indication information indicating use of a transmit beam selection technique out of a plurality of transmit beam selection techniques for selecting a transmit beam for transmitting a signal to a terminal apparatus; and transmitting the indication information to the terminal apparatus.

A fourth program of the present invention is a program causing a processor to execute: receiving, from a base station, indication information indicating use of a transmit beam selection technique out of a plurality of transmit beam selection techniques for the base station to select a transmit beam for transmitting a signal to a terminal apparatus; and identifying a transmit beam selected by the base station, based on the indication information.

A third recording medium of the present invention is a non-transitory computer-readable recording medium having recorded thereon a program causing a processor to execute: obtaining indication information indicating use of a transmit beam selection technique out of a plurality of transmit beam selection techniques for selecting a transmit beam for transmitting a signal to a terminal apparatus; and transmitting the indication information to the terminal apparatus.

A fourth recording medium of the present invention is a non-transitory computer-readable recording medium having recorded thereon a program causing a processor to execute: receiving, from a base station, indication information indicating use of a transmit beam selection technique out of a plurality of transmit beam selection techniques for the base station to select a transmit beam for transmitting a signal to a terminal apparatus; and identifying a transmit beam selected by the base station, based on the indication information.

Advantageous Effects of Invention

According to the present invention, it is possible for a terminal apparatus to identify a beam to be used by a base station while reducing radio resource use. Note that, according to the present invention, instead of or together with the above effects, other effects may be exerted.

BRIEF DESCRIPTION OF THE DRAWINGS

FIG. 1 is a schematic view for describing beamforming;

FIG. 2A is a diagram for describing a transmit beam discussed for PDCCH, which is a physical channel used for transmission of control information and the like; FIG. 2B is a diagram for describing a transmit beam discussed for PDSCH, which is a physical channel used for transmission of data and the like;

DESCRIPTION OF THE EXAMPLE EMBODIMENTS

Figure 3:
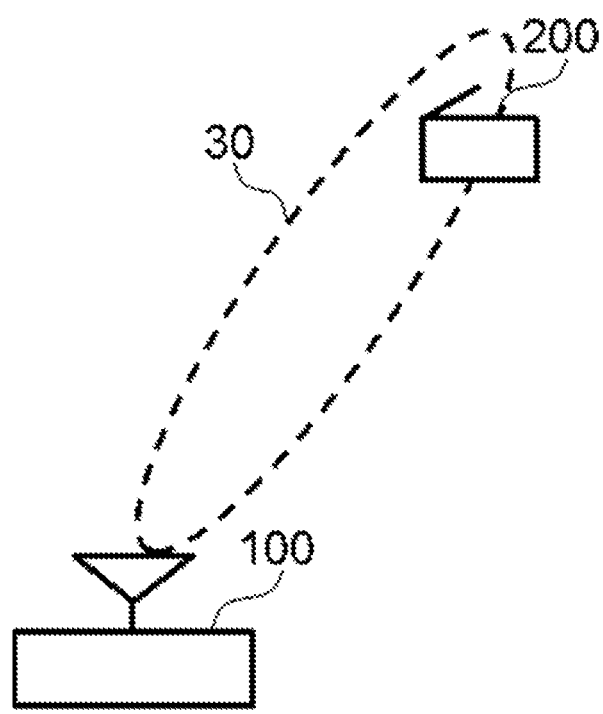
FIG. 3 is an explanatory diagram illustrating an example of a schematic configuration of a system 1 according to example embodiments of the present invention.

Hereinafter, example embodiments of the present invention will be described in detail with reference to the accompanying drawings. Note that, in the Specification and drawings, elements to which the similar descriptions are applicable are denoted by the same reference signs, and overlapping descriptions may hence be omitted.

Descriptions will be Given in the Following Order.
1. Related Art
2. Overview of Example Embodiments of the Present Invention
3. Configuration of System according to Example Embodiments of the Present Invention
4. First Example Embodiment
4.1. Configuration of Base Station
4.2. Configuration of Terminal Apparatus
4.3. Technical Features
5. Second Example Embodiment
5.1. Configuration of Base Station
5.2. Configuration of Terminal Apparatus
5.3. Technical Features
6. Third Example Embodiment
6.1. Configuration of Base Station
6.2. Configuration of Terminal Apparatus
6.3. Technical Features
7. Fourth Example Embodiment
7.1. Configuration of Base Station
7.2. Configuration of Terminal Apparatus
7.3. Technical Features
8. Other Example Aspects 1. Related Art A description will be given of beamforming as a technique related to the present example embodiments assumed in 3GPP.

Discussion is being conducted about a base station transmitting data to a distant terminal apparatus with high gain by performing beamforming in a high frequency band, in a system conforming to fifth-generation (5G) standards in 3GPP. In a case of performing beamforming, the terminal apparatus, for example, performs the following processing to form a suitable receive beam that improves reception quality for a transmit beam from a base station.

First, as illustrated in FIG. 1, a base station 10 transmits a reference signal to a terminal apparatus 20 by using a plurality of transmit beams to allow the terminal apparatus 20 to adjust a receive beam so that reception quality for each transmit beam would be optimal, and then measures reception quality of each transmit beam. Subsequently, the terminal apparatus 20 selects a plurality of preferable transmit beams, based on a result of the measurement of the reception quality and feeds transmit beam identifiers back to the base station 10 side. As a result of this, the base station 10 holds a plurality of transmit beam identifiers for each terminal apparatus 20. The terminal apparatus 20 similarly holds a plurality of transmit beam identifiers and further holds information related to a receive beam suitable for each transmit beam. In this way, information related to a plurality of transmit beams (transmit beam identifiers, reception quality, and the like) can be shared in advance between the base station 10 and the terminal apparatus 20.

In addition, a discussion is being conducted about using, in a case of performing beamforming, different transmit beams for PDCCH, which is a physical channel used in transmission of control information and the like, and PDSCH, which is a physical channel used for transmission of data and the like. A discussion is being conducted about using beams separately. Specifically, in a case of PDCCH, the base station 10 uses a wide beam B1 for transmission, for example as illustrated in FIG. 2A to give a higher priority to coverage; in a case of PDSCH, the base station 10 uses a narrow beam B2 for transmission, for example as illustrated in FIG. 2B to give a higher priority to gain.

2. Overview of Example Embodiments of the Present Invention (1) Technical Issues In the above-described case of performing beamforming, the terminal apparatus needs to promptly identify a transmit beam to be used by the base station for the following reason, for example.

Specifically, if an instantaneous failure (link failure) has occurred in a transmit beam from the base station, in other words, if the transmit beam does not fully reach the terminal apparatus, the base station needs to promptly switch the transmit beam. In response to such switching, the terminal apparatus needs to promptly identify the transmit beam.

In particular, in a case of using different beams for PDCCH and PDSCH as illustrated in FIG. 2, reception is stably successful with the transmit beam used for PDCCH since the used transmit beam is wide, while reception may frequently fail with the transmit beam used for PDSCH since the used transmit beam is narrow. To address this, the base station needs to change from a state in which reception may frequently fail to a state in which reception succeeds as soon as possible, by promptly switching the transmit beam used on PDSCH. In such a case of promptly switching a transmit beam, the terminal apparatus needs to promptly identify the transmit beam to be used on PDSCH.

To enable this, by the base station transmitting an identifier of the transmit beam to the terminal apparatus in DCI on PDCCH, the terminal apparatus can promptly identify the transmit beam to be used on PDSCH. Here, the DCI is downlink control information including information for decoding PDSCH, such as mapping information and modulation information of the corresponding PDSCH, and is transmitted on PDCCH.

However, including the identifier of the transmit beam in the DCI as described above increases the total number of bits of the DCI, which may use a lot of radio resources. In other words, this causes an issue of increasing an overhead.

An example object of the example embodiments of the present invention is to enable the terminal apparatus to identify a transmit beam to be used by the base station while reducing radio resource use.

(2) Technical Features

According to the example embodiments of the present invention, a base station, for example, obtains obtainable information obtainable for both the base station and the terminal apparatus, the obtainable information being neither communication quality information nor an identifier indicating a transmit beam for transmission to the terminal apparatus, and selects a transmit beam for transmission to the terminal apparatus, from among a plurality of candidate transmit beams, based on the obtainable information.

Moreover, according to the example embodiments of the present invention, the terminal apparatus, for example, obtains the obtainable information and identifies a transmit beam for transmission to the terminal apparatus, the transmit beam being selected by the base station, from among the plurality of candidate transmit beams, based on the obtainable information.

This, for example, enables the terminal apparatus to identify the transmit beam to be used by the base station while reducing radio resource use.

Note that the above-described technical features are concrete examples of the example embodiments of the present invention, and it is apparent that the present example embodiments are not limited to the above-described technical features.

3. Configuration of System according to Example Embodiments of the Present Invention With reference to FIG. 3, an example of a configuration of a system 1 according to the present example embodiments will be described. FIG. 3 is an explanatory diagram illustrating an example of a schematic configuration of the system 1 according to the example embodiments of the present invention. With reference to FIG. 3, the system 1 includes a base station 100 and a terminal apparatus 200.

For example, the system 1 is a system conforming to 3GPP standards. More specifically, the system 1 is a system conforming to fifth-generation (5G) standards. Alternatively, the system 1 may be a Universal Mobile Telecommunication System (UMTS) conforming to LTE/LTE-Advanced/LTE-Advanced Pro and/or System Architecture Evolution (SAE) or third-generation (3G) standards. It is apparent that the system 1 is not limited to these examples.

(1) Base Station 100

The base station 100 is a node configured to perform wireless communication with a terminal apparatus, in other words, a Radio Access Network (RAN) node. For example, the base station 100 transmits a signal through a beam 30 directed to the terminal apparatus 200. The base station 100 may be an eNB, a generation Node B (gNB) and/or a Transmission Reception Point (TRP) in 5G, or a Node B and/or a Radio Network Controller (RNC) in 3G. The base station 100 may include a plurality of units (or a plurality of nodes). The plurality of units (or the plurality of nodes) may include a first unit (or a first node) configured to perform higher protocol layer processing and a second unit (or a second node) configured to perform lower protocol layer processing. As an example, the first unit may be referred to as a center/central unit (CU), and the second unit may be referred to as a distributed unit (DU) or an access unit (AU). As another example, the first unit may be referred to as a digital unit (DU), and the second section may be referred to as a radio unit (RU) or a remote unit (RU). The digital unit (DU) may be a base band unit (BBU), and the RU may be a remote radio head (RRH) or a remote radio unit (RRU). It is apparent that the terms for the first unit (or the first node) and the second unit (or the second node) are not limited to these examples. Alternatively, the base station 100 may be a single unit (or a single node). In this case, the base station 100 may be one of the plurality of units (e.g., either one of the first unit and the second unit) or may be connected to another unit of the plurality of units (e.g., the other one of the first unit and the second unit).

(2) Terminal Apparatus 200

The terminal apparatus 200 performs wireless communication with a base station. For example, the terminal apparatus 200 receives a signal transmitted from the base station 100 through the beam 30 directed to the terminal apparatus 200. For example, the terminal apparatus 200 is a UE.

4. First Example Embodiment

Next, a description will be given of a first example embodiment of the present invention with reference to FIG. 4 to FIG. 7.

<4.1. Configuration of Base Station>

Figure 4:
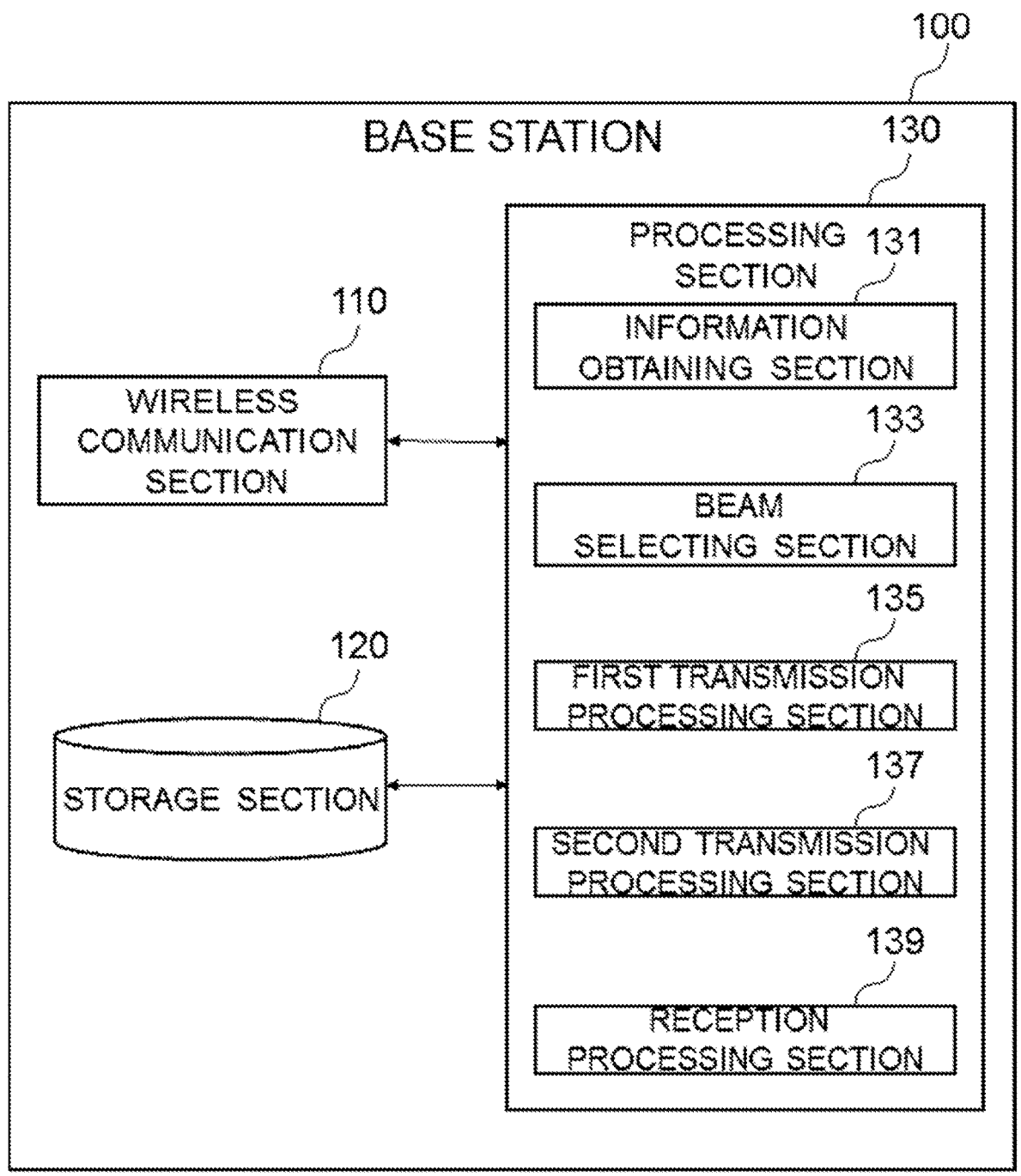
FIG. 4 is a block diagram illustrating an example of a schematic configuration of a base station 100 according to a first example embodiment.

Next, with reference to FIG. 4, a description will be given of an example of a configuration of the base station 100 according to the first example embodiment. FIG. 4 is a block diagram illustrating an example of a schematic configuration of the base station 100 according to the first example embodiment. With reference to FIG. 4, the base station 100 includes a wireless communication section 110, a storage section 120, and a processing section 130.

(1) Wireless Communication Section 110

The wireless communication section 110 wirelessly transmits and/or receives a signal. For example, the wireless communication section 110 receives a signal from a terminal apparatus and transmits a signal to the terminal apparatus.

(2) Storage Section 120

The storage section 120 temporarily or permanently stores programs and parameters for operations of the base station 100 as well as various data.

(3) Processing Section 130

The processing section 130 provides various functions of the base station 100. The processing section 130 includes an information obtaining section 131, a beam selecting section 133, a first transmission processing section 135, a second transmission processing section 137, and a reception processing section 139. Note that the processing section 130 may further include constituent elements other than these constituent elements. In other words, the processing section 130 may also perform operations other than the operations of these constituent elements. Concrete operations of the information obtaining section 131, the beam selecting section 133, the first transmission processing section 135, the second transmission processing section 137, and the reception processing section 139 will be described later in detail.

For example, the processing section 130 (first transmission processing section 135) transmits, via the wireless communication section 110, a signal to a terminal apparatus (e.g., the terminal apparatus 200) through a transmit beam.

(4) Implementation Example

The wireless communication section 110 may be implemented with a directional antenna, a radio frequency (RF) circuit, and the like. The storage section 120 may be implemented with a memory (e.g., a nonvolatile memory and/or a volatile memory) and/or a hard disk, and the like. The processing section 130 may be implemented with a baseband (BB) processor and/or a different processor, and the like. The information obtaining section 131, the beam selecting section 133, the first transmission processing section 135, the second transmission processing section 137, and the reception processing section 139 may be implemented with the same processor or may be implemented with separate processors. The memory (storage section 120) may be included in such a processor (chip).

The base station 100 may include a memory configured to store a program and one or more processors that can execute the program, and the one or more processors may perform operations of the processing section 130 (operations of the information obtaining section 131, the beam selecting section 133, the first transmission processing section 135, the second transmission processing section 137, and the reception processing section 139). The program may be a program for causing the processor(s) to perform operations of the processing section 130 (operations of the information obtaining section 131, the beam selecting section 133, the first transmission processing section 135, the second transmission processing section 137, and the reception processing section 139).

<4.2. Configuration of Terminal Apparatus>

Figure 5:
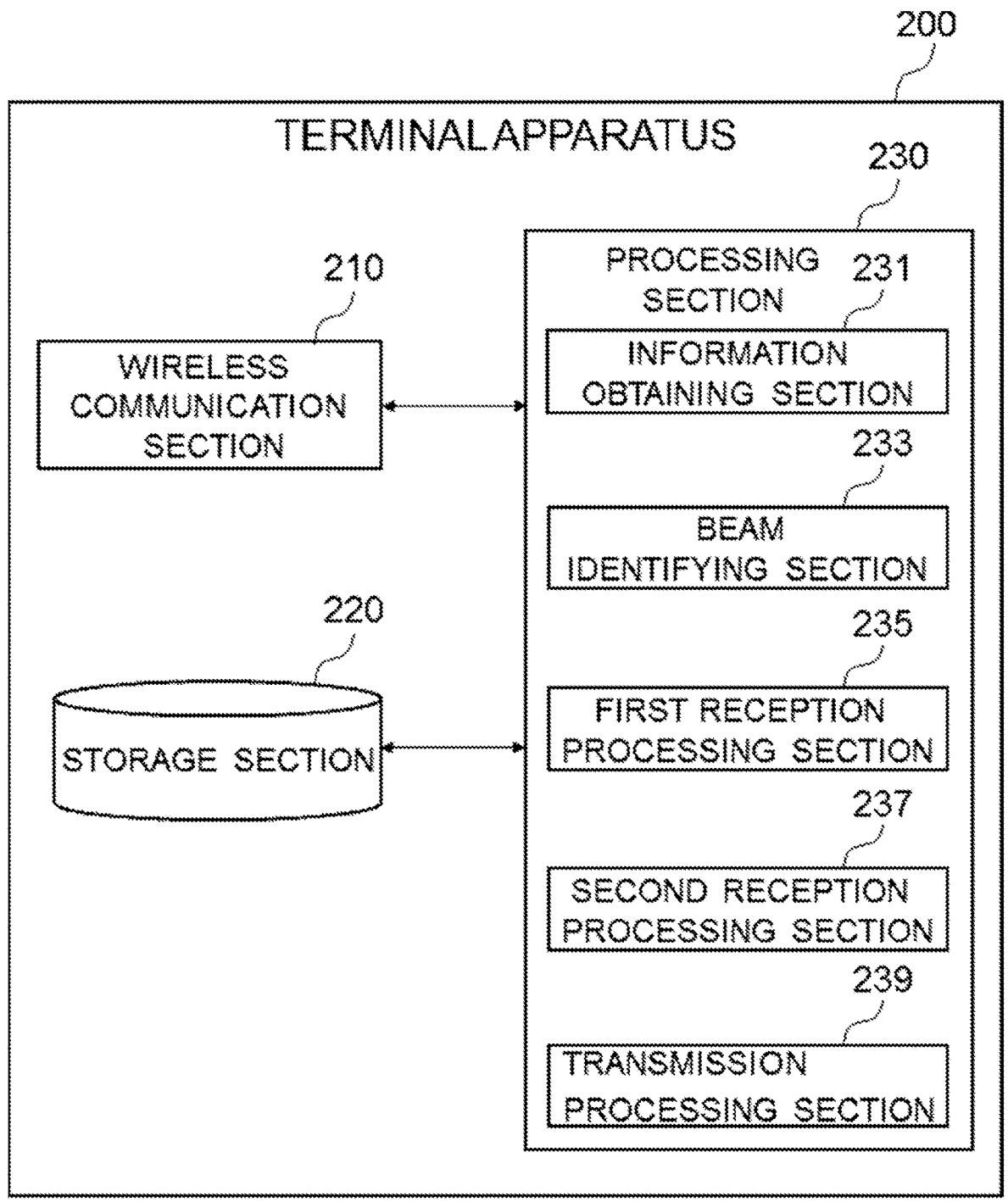
FIG. 5 is a block diagram illustrating an example of a schematic configuration of a terminal apparatus 200 according to the first example embodiment.

Next, with reference to FIG. 5, an example of a configuration of the terminal apparatus 200 according to the first example embodiment will be described. FIG. 5 is a block diagram illustrating an example of a schematic configuration of the terminal apparatus 200 according to the first example embodiment. With reference to FIG. 5, the terminal apparatus 200 includes a wireless communication section 210, a storage section 220, and a processing section 230.

(1) Wireless Communication Section 210

The wireless communication section 210 wirelessly transmits and/or receives a signal. For example, the wireless communication section 210 receives a signal from the base station 100 and transmits a signal to the base station 100.

(2) Storage Section 220

The storage section 220 temporarily or permanently stores programs and parameters for operations of the terminal apparatus 200 as well as various data.

(3) Processing Section 230

The processing section 230 provides various functions of the terminal apparatus 200. The processing section 230 includes an information obtaining section 231, a beam identifying section 233, a first reception processing section 235, a second reception processing section 237, and a transmission processing section 239. Note that the processing section 230 may further include constituent elements other than these constituent elements. In other words, the processing section 230 may also perform operations other than the operations of these constituent elements. Concrete operations of the information obtaining section 231, the beam identifying section 233, the first reception processing section 235, the second reception processing section 237, and the transmission processing section 239 will be described later in detail.

For example, the processing section 230 (first reception processing section 235) receives, via the wireless communication section 210, a signal transmitted from the base station 100 to the terminal apparatus 200 through a transmit beam.

(4) Implementation Example

The wireless communication section 210 may be implemented with an antenna, a radio frequency (RF) circuit, and the like. The storage section 220 may be implemented with a memory (e.g., a nonvolatile memory and/or a volatile memory) and/or a hard disk, and the like. The processing section 230 may be implemented with a baseband (BB) processor and/or a different processor, and the like. The information obtaining section 231, the beam identifying section 233, the first reception processing section 235, the second reception processing section 237, and the transmission processing section 239 may be implemented with the same processor or may be implemented with separate processors. The memory (storage section 220) may be included in such a processor (chip).

The terminal apparatus 200 may include a memory configured to store a program and one or more processors that can execute the program, and the one or more processors may perform operations of the processing section 230 (operations of the information obtaining section 231, the beam identifying section 233, the first reception processing section 235, the second reception processing section 237, and the transmission processing section 239). The program may be a program for causing the processor(s) to perform operations of the processing section 230 (operations of the information obtaining section 231, the beam identifying section 233, the first reception processing section 235, the second reception processing section 237, and the transmission processing section 239).

<4.3. Technical Features>

Next, technical features of the first example embodiment will be described.

Base Station

The base station 100 (information obtaining section 131) obtains obtainable information obtainable for both the base station 100 and the terminal apparatus 200, the obtainable information being neither communication quality information nor an identifier of a transmit beam. The base station 100 (beam selecting section 133) then selects a transmit beam for transmission to the terminal apparatus 200 from among a plurality of candidate transmit beams, based on the obtainable information. Furthermore, the base station 100 (first transmission processing section 135) transmits a signal to the terminal apparatus 200 through the selected transmit beam. The transmit beam is, for example, a transmit beam for transmission on a data channel to the terminal apparatus 200.

Terminal Apparatus

The terminal apparatus 200 (information obtaining section 231) obtains obtainable information obtainable for both the base station 100 and the terminal apparatus 200, the obtainable information being neither communication quality information nor an identifier indicating a transmit beam. The terminal apparatus 200 (beam identifying section 233) then identifies the transmit beam for transmission to the terminal apparatus 200, the transmit beam being selected by the base station 100, from among the plurality of candidate transmit beams, based on the obtainable information. Furthermore, the terminal apparatus 200 (first reception processing section 235) further adjusts a receive beam so that reception quality for the transmit beam selected by the base station 100 would be optimal, and receives a signal transmitted from the base station 100.

(1) Obtainable Information

As described above, the obtainable information is information obtainable for both the base station 100 and the terminal apparatus 200, the obtainable information being neither an identifier directly indicating the selected transmit beam nor reception quality information indicating reception quality measured by the terminal apparatus 200. Specifically, the obtainable information includes the following pieces of information, for example.

Common Information Common to Terminal Apparatuses

The obtainable information includes common information common to terminal apparatuses, for example.

As a first example, the common information common to the terminal apparatuses includes time information indicating time, for example, includes at least one of a system frame number, a subframe number, a slot number, and a mini-slot number.

As a second example, the common information common to terminal apparatuses may include information common to terminal apparatuses connected to the base station 100, or the information may be identification information (e.g., a TRP ID) of the base station 100.

As a third example, the common information common to terminal apparatuses may include information common to terminal apparatuses performing communication in the same cell, or the information may be cell identification information (e.g., physical cell identity (PCI)).

Note that it is apparent that the common information is not limited to the above-described examples.

Information Specific to Terminal Apparatus

The obtainable information may include information specific to the terminal apparatus 200 (referred to as "terminal-specific information" below), for example.

As a first example, the terminal-specific information includes resource information of radio resource to be used for transmission to the terminal apparatus 200. Specifically, the radio resource is radio resource of a control channel to be used for transmission of control information to the terminal apparatus 200 or radio resource of a data channel to be used for transmission of data to the terminal apparatus 200. Here, the control channel is, for example, PDCCH, and the data channel is, for example, PDSCH. Note that the control channel may be new radio-physical downlink control channel (NR-PDCCH), or the data channel may be new radio-physical downlink shared channel (NR-PDSCH). Specifically, the resource information may include at least one of a start index of a control channel element (CCE), a start number of a physical resource block (PRB), an orthogonal frequency division multiplexing (OFDM) symbol number, for example. Note that the resource information may include a start index of a new radio-control channel element (NR-CCE).

As a second example, the terminal-specific information may include identification information of a retransmission control process to be used for transmission to the terminal apparatus 200. The retransmission control process is, for example, a hybrid automatic repeat request (HARD) process.

As a third example, the terminal-specific information may be identification information of the terminal apparatus 200. Specifically, the identification information of the terminal apparatus 200 is a radio network temporary identifier (RNTI) of the terminal apparatus 200, for example.

Offset Value

The obtainable information may include an offset value. The obtainable information including an offset value can prevent the same transmit beam from being selected repeatedly, as will be described later. The offset value may be information common to the terminal apparatuses or information specific to the terminal apparatus 200.

(2) Beam Selection and Beam Identification

The base station 100 (beam selecting section 133) selects a transmit beam to be used for transmission of a signal to the terminal apparatus 200 from among the plurality of candidate transmit beams. As the base station 100 (beam selecting section 133), the terminal apparatus 200 (beam identifying section 233) also identifies the transmit beam to be used for transmission of a signal to the terminal apparatus 200, from among the plurality of candidate transmit beams.

Note that the transmit beam selected or identified may be one or a plurality of transmit beams. Different transmit beams may be selected or identified for each of the control channel and the data channel.

Here, the plurality of candidate transmit beams are, for example, a plurality of transmit beams shared in advance between the base station 100 and the terminal apparatus 200 by the following method, and are, specifically, N transmit beams (N is an integer equal to or greater than 2) indexed with indices of 0 to N−1. First, the base station 100 transmits a reference signal to the terminal apparatus 200 by using a plurality of transmit beams to allow the terminal apparatus 200 to adjust a receive beam so that reception quality for each transmit beam would be optimal, and then measures reception quality of each transmit beam. Subsequently, the terminal apparatus 200 selects N preferable transmit beams, based on a result of the measurement of the reception quality and feeds transmit beam identifiers back to the base station 100 side. In this way, N transmit beams (N is an integer equal to or greater than 2) are provided between the base station 100 and the terminal apparatus 200.

Next, a concrete example related to beam selection and beam identification will be described.

(2-1) Example Using Time Information Indicating Time

In a case of using time information indicating time, the base station 100 (beam selecting section 133) can, for example, select a transmit beam to be used for transmission of a signal to the terminal apparatus 200, based on calculation of Equation (1) below.

$$\text{Transmit beam to be used} = [\text{time index}] \bmod N \tag{1}$$

More specifically, the base station 100 (beam selecting section 133) can select a transmit beam to be used for transmission by applying, to Equation (1) above, information indicating time and incremented in a cycle extremely shorter than a retransmission interval of PDSCH, such as a slot number or a mini-slot number. In this way, a transmit beam is selected randomly or almost randomly, and hence diversity effects by the random selection of transmission beams can be obtained.

Alternatively, the base station 100 (beam selecting section 133) can select a transmit beam to be used for transmission by applying, to Equation (1) above, information indicating time and incremented in a cycle close to a retransmission interval of PDSCH, such as a system frame number or a subframe number. In this way, a transmit beam is selected with a certain level of regularity, and hence diversity effects by the cyclic switching of transmission beams can be obtained.

(2-2) Example Using Radio Resource Information of PDCCH

In a case of using radio resource information of PDCCH, the base station 100 (beam selecting section 133) can, for example, select a transmit beam to be used for transmission of a signal to the terminal apparatus 200, based on calculation of Equation (2) below.

$$\text{Transmit beam to be used} = [\text{radio resource information of PDCCH}] \bmod N \tag{2}$$

Specifically, the base station 100 (beam selecting section 133) first determines a transmit beam to be used and determines radio resource information of PDCCH so as to satisfy Equation (2) above. As a concrete example of the radio resource information of PDCCH, the base station 100 (beam selecting section 133) can, for example, select an arbitrary transmit beam by determining a start index of a CCE.

(2-3) Example Using Identification Information of Retransmission Control Process or Identification Information of Terminal Apparatus The same identification information of a retransmission control process, such as identification information of a HARQ process, described above is used at initial transmission and retransmission of PDSCH. In view of this, in a case of using identification information of a retransmission control process, for example, the base station 100 (beam selecting section 133) can select a transmit beam to be used for transmission of a signal to the terminal apparatus 200, based on calculation of Equation (3) below.

$$\text{Transmit beam to be used} = ([\text{information indicating time}] + \text{identification information of HARQ process}) \bmod N \tag{3}$$

Similarly, the same identification information of the terminal apparatus, such as an RNTI, described above is used at initial transmission and retransmission of PDSCH. In view of this, in a case of using identification information of the terminal apparatus, the base station 100 (beam selecting section 133) can, for example, select a transmit beam to be used for transmission of a signal to the terminal apparatus 200, based on calculation of Equation (4) below.

$$\text{Transmit beam to be used} = ([\text{radio resource information of PDCCH}] + \text{RNTI}) \bmod N \tag{4}$$

By combining identification information of a retransmission control process and identification information of a terminal apparatus with information indicating time or radio resource information of PDCCH as in Equation (3) or Equation (4) above, it is possible to avoid the same information from being selected for information indicating time or radio resource information of PDCCH in a case of selecting a transmit beam for each of a plurality of terminal apparatuses. In other words, even in a case that the base station 100 uses the same transmit beam identifier for the plurality of terminal apparatuses, different pieces of information can be used as information indicating time or radio resource information of PDCCH, and consequently different time-frequency resources can be used. In other words, radio resource distribution can be attempted.

(2-4) Example Using Offset Value

In a case that the obtainable information includes an offset value, the base station 100 (beam selecting section 133) selects a transmit beam from among the plurality of candidate transmit beams, based on the offset value and identification information of a transmit beam selected in the past.

Specifically, the base station 100 (beam selecting section 133) offsets the identification information of the transmit beam selected in the past, by using a result of calculation of ((system frame number mod (N−1))+1). More specifically, the base station 100 (beam selecting section 133) can select a transmit beam to be used for transmission of a signal to the terminal apparatus 200, based on calculation of Equation (5) below.

$$(((\text{System frame number} \bmod (N-1))+1) + \text{identification information of transmit beam selected in past}) \bmod N \tag{5}$$

In this way, selecting a transmit beam can impose restriction so that the currently used transmit beam would not be used in succession.

(3) Switching of Beam Selection Technique

Base Station

The base station 100 (second transmission processing section 137) transmits, to the terminal apparatus 200, first indication information indicating that the base station 100 selects a transmit beam, based on the obtainable information.

As an example, the first indication information is, for example, 1-bit information. When the first indication information is 0, this indicates that the base station 100 selects a transmit beam, based on the obtainable information; when the first indication information is 1, this indicates that the base station 100 selects a transmit beam having the highest quality (referred to also as a best beam, below) among the above N transmit beams.

The base station 100 may transmit the first indication information to the terminal apparatus 200 upon determination that a new transmit beam should be used. In particular, the base station 100 may transmit the first indication information to the terminal apparatus 200 upon occurrence of beam pair link failure between the base station 100 and the terminal apparatus 200.

More specifically, the base station 100, for example, determines that link failure has occurred, for example, in a case that the base station 100 (reception processing section 139) has received NACK from the terminal apparatus 200 a prescribed number of times in a state where the base station 100 is transmitting a signal to the terminal apparatus 200 through the best beam. The base station 100 (second transmission processing section 137) then transmits, to the terminal apparatus 200, the first indication information indicating that the base station 100 selects a transmit beam (information of a 1-bit value indicating 0), based on the obtainable information.

Technique for Transmitting First Indication Information

The base station 100 (second transmission processing section 137) transmits downlink control information including resource allocation information for the terminal apparatus 200 and the first indication information. Using 1-bit information as the first indication information as described above can notify the terminal apparatus 200 that the base station 100 selects a transmit beam based on the obtainable information while suppressing the overhead of the downlink control information from increasing. Note that the first indication information is not limited to downlink control information and may be transmitted in a medium access control (MAC) control element, a radio resource control (RRC) message, or the like.

Terminal Apparatus

The terminal apparatus 200 (second reception processing section 237) receives, from the base station 100, the first indication information indicating that the base station 100 selects a transmit beam, based on the obtainable information. By receiving the first indication information in this way, the terminal apparatus 200 (beam identifying section 233) can, for example, identify the transmit beam from among the plurality of candidate transmit beams, based on the obtainable information, even in a state where the terminal apparatus 200 has received a signal from the base station 100 through the best beam until immediately before receiving the first indication information.

(4) Flow of Processing

Base Station

Figure 6:
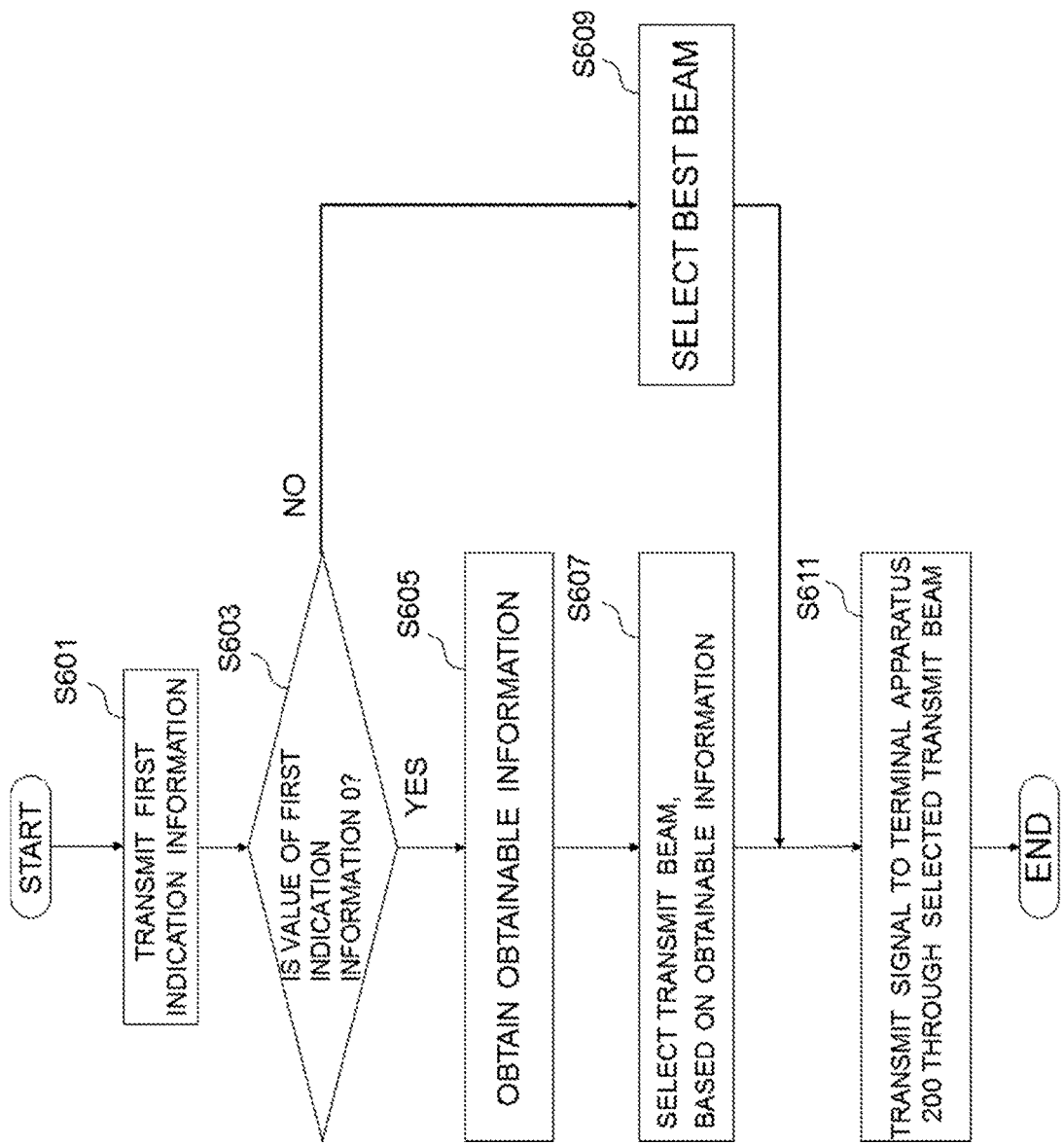
FIG. 6 is a flowchart for describing an example of a schematic flow of processing in the base station 100 according to the first example embodiment.

FIG. 6 is a flowchart for describing an example of a schematic flow of processing in the base station 100 according to the first example embodiment.

The base station 100 (second transmission processing section 137) transmits the first indication information to the terminal apparatus 200 (S601). The base station 100 then determines whether or not the value of the first indication information is 0 (S603).

Here, when the first indication information indicates 0 (S603: YES), in other words, when the first indication information indicates that the base station 100 selects a transmit beam, based on the obtainable information, the base station 100 (information obtaining section 131) obtains the obtainable information (S605). Subsequently, the base station 100 (beam selecting section 133) selects a transmit beam for transmission to the terminal apparatus 200, based on the obtainable information (S607).

Here, when the first indication information indicates 1 instead of 0 (S603: NO), in other words, when the first indication information indicates that the base station 100 selects a best beam, the base station 100 (beam selecting section 133) selects a best beam as the transmit beam (S609).

The base station 100 (first transmission processing section 135) then transmits a signal to the terminal apparatus 200 through the transmit beam selected by the beam selecting section 133 (S611).

Terminal Apparatus

Figure 7:
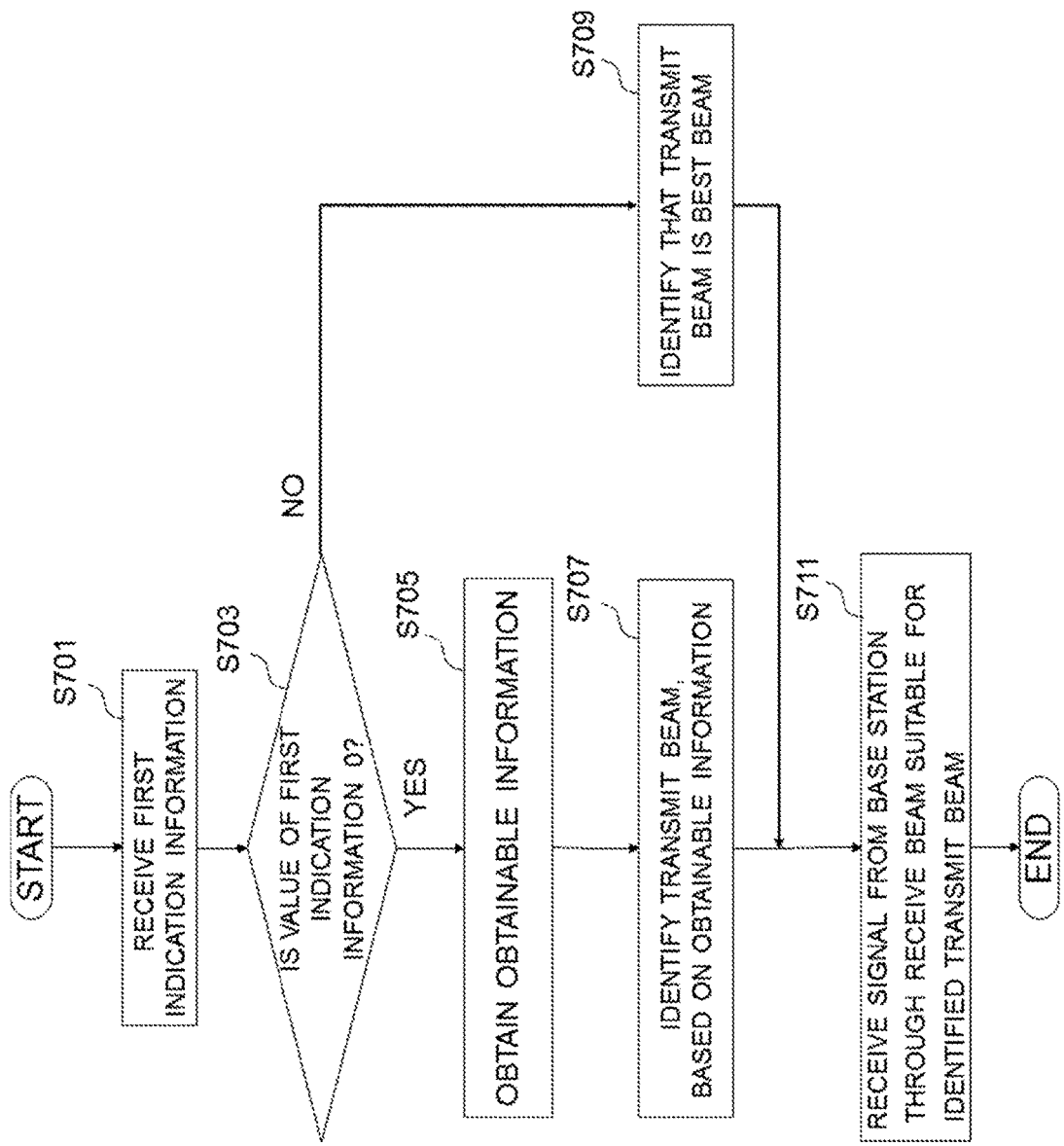
FIG. 7 is a flowchart for describing an example of a schematic flow of processing in the terminal apparatus 200 according to the first example embodiment.

FIG. 7 is a flowchart for describing an example of a schematic flow of processing in the terminal apparatus 200 according to the first example embodiment.

The terminal apparatus 200 (second reception processing section 237) receives the first indication information from the base station 100 (S701). The terminal apparatus 200 then determines whether or not the value of the first indication information is 0 (S703).

Here, when the first indication information indicates 0 (S703: YES), in other words, when the first indication information indicates that the terminal apparatus 200 selects a transmit beam, based on the obtainable information, the terminal apparatus 200 (information obtaining section 231) obtains the obtainable information (S705). Subsequently, the terminal apparatus 200 (beam identifying section 233) identifies the transmit beam, based on the obtainable information (S707).

In contrast, when the first indication information indicates 1 instead of 0 (S703: NO), in other words, when the first indication information indicates that the base station 100 selects a best beam, the terminal apparatus 200 (beam identifying section 233) identifies that the transmit beam is the best beam (S709).

The terminal apparatus 200 (first reception processing section 235) then receives a signal from the base station 100 through a receive beam suitable for the transmit beam identified by the beam identifying section 233 (S711).

Through the processing illustrated in FIG. 6 and FIG. 7 described above, it is possible for the terminal apparatus to identify the transmit beam to be used by the base station while reducing radio resource use.

(5) Example Alterations

The first example embodiment can be combined with processing illustrated in the following example alterations, for example.

(5-1) First Example Alteration: Beam Selection and Identification Using Second Indication Information Base Station The base station 100 (second transmission processing section 137) may transmit, to the terminal apparatus 200, second indication information indicating timing of selecting a transmit beam, based on the obtainable information. Specifically, the timing indicated by the second indication information may be "immediately" or may indicate a time interval in a unit of subframe, millisecond, or the like, for example. This timing may indicate, for example, the time when the base station 100 determines that a new transmit beam should be used, the time when a beam pair link failure between the base station 100 and the terminal apparatus 200 has occurred, or the like.

Specifically, the base station 100 (second transmission processing section 137) transmits downlink control information including resource allocation information for the terminal apparatus 200 and the second indication information. In particular, using 1-bit information as the second indication information can notify the terminal apparatus 200 of the timing at which the base station 100 selects a transmit beam based on the obtainable information while suppressing the overhead of the downlink control information from increasing. Note that the second indication information is not limited to downlink control information and may be transmitted in a medium access control (MAC) control element, a radio resource control (RRC) message, or the like.

Terminal Apparatus

The terminal apparatus 200 (second reception processing section 237) receives, from the base station 100, the second indication information indicating the timing at which the base station 100 selects a transmit beam, based on the obtainable information. At the timing based on the second indication information, the terminal apparatus 200 (beam identifying section 233) identifies the transmit beam, based on the obtainable information. In this way, the terminal apparatus 200 identifies a transmit beam only at the timing based on the second indication information, and hence the terminal apparatus 200 can continuously use the currently-identified transmit beam until the timing based on the second indication information. Furthermore, the timing at which the terminal apparatus 200 identifies a transmit beam may be the same as the timing indicated by the second indication information or may be an arbitrary timing before the base station 100 transmits a transmit beam next time. In this way, the transmit beam can be changed only at an appropriate timing, and hence this can prevent unnecessary switching of transmit beams.

(5-2) Second Example Alteration: Cyclic Beam Selection and Identification

Base Station

The base station 100 (beam selecting section 133) may select a transmit beam, based on the obtainable information cyclically, for example, every five or ten radio frames, or the like. To notify the terminal apparatus 200 that the base station 100 (beam selecting section 133) thus selects a transmit beam cyclically, the base station 100 (second transmission processing section 137) transmits, to the terminal apparatus 200, cycle information indicating a cycle of selecting a transmit beam, based on the obtainable information.

Specifically, the base station 100 (second transmission processing section 137) transmits downlink control information including resource allocation information for the terminal apparatus 200 and the cycle information. In particular, using 1-bit information as the cycle information can notify the terminal apparatus 200 of the cycle at which the base station 100 selects a transmit beam, based on the obtainable information while suppressing the overhead of the downlink control information from increasing. Note that the cycle information is not limited to downlink control information and may be transmitted in a medium access control (MAC) control element, a radio resource control (RRC) message, or the like.

Terminal Apparatus

The terminal apparatus 200 (second reception processing section 237) receives, from the base station 100, the cycle information indicating the cycle of selecting a transmit beam, based on the obtainable information. By receiving such cycle information, the terminal apparatus 200 (beam identifying section 233) identifies a transmit beam, based on the obtainable information at the cycle indicated by the cycle information. In other words, the terminal apparatus 200 can continuously use the currently identified transmit beam until the next cycle. In this way, unnecessary switching of transmit beams can be prevented.

(5-3) Third Example Alteration: Beam Selection and Identification based on Change of the Obtainable Information Base Station The base station 100 (beam selecting section 133) may select a transmit beam, based on the obtainable information every time the obtainable information is changed. In other words, the base station 100 (beam selecting section 133) may select a transmit beam, based on the obtainable information after the change.

Terminal Apparatus

The terminal apparatus 200 (beam identifying section 233) may also select a transmit beam, based on the obtainable information every time the obtainable information is changed. In other words, every time the terminal apparatus 200 (information obtaining section 231) changes the obtainable information, the terminal apparatus 200 (beam identifying section 233) may select a transmit beam, based on the obtainable information after the change. In this way, the terminal apparatus 200 can accurately identify a transmit beam selected on the base station 100 side, according to each change of the obtainable information.

(5-4) Fourth Example Alteration: Beam Selection and Identification based on Notification Information from Terminal Apparatus Base Station The base station 100 (beam selecting section 133) may select a transmit beam, based on the obtainable information every time notification information from the terminal apparatus 200 is received. Here, the notification information is, for example, information for notifying the base station 100 that the terminal apparatus 200 has been failed to receive a signal through a transmit beam from the base station 100 for a predetermined time period (e.g., 10 ms or the like).

Note that the notification information may be information for notifying the base station 100 that the terminal apparatus 200 has successfully received a signal through a transmit beam from the base station 100. In this case, the base station 100 may select a transmit beam, based on the obtainable information, in a case of not receiving notification information from the terminal apparatus 200 for a certain time period, for example. Note that the notification information in this case may be transmitted from the terminal apparatus 200 to the base station 100 cyclically.

Terminal Apparatus

In the case of not having been failed to receive a signal through a transmit beam from the base station 100 for the predetermined time period (e.g., 10 ms or the like) as described above, the terminal apparatus 200 (transmission processing section 239) transmits notification information to the base station 100 in order to notify the base station 100 of failure of reception. Then, every time the terminal apparatus 200 transmits notification information to the base station 100, more specifically, every time the terminal apparatus 200 receives ACK corresponding to the transmitted notification information from the base station 100, the terminal apparatus 200 (beam identifying section 233) identifies the transmit beam, based on the obtainable information. The terminal apparatus 200 notifying the base station 100 of such notification information may enable the terminal apparatus 200 to shorten a period of not successfully receiving a signal transmitted from the base station 100.

5. Second Example Embodiment

Next, a description will be given of a second example embodiment of the present invention with reference to FIG. 8 to FIG. 11.

<5.1. Configuration of Base Station>

Figure 8:
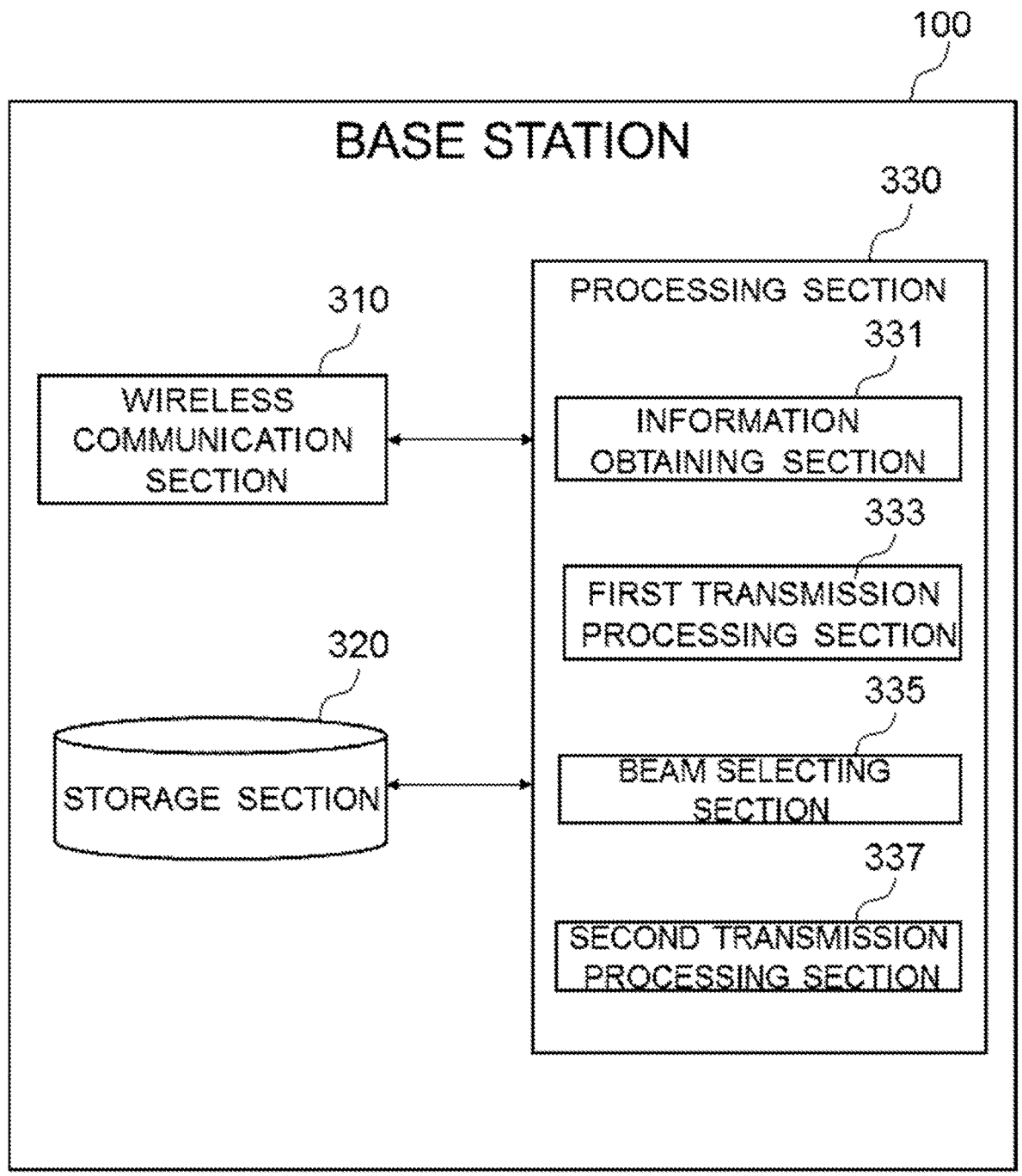
FIG. 8 is a block diagram illustrating an example of a schematic configuration of a base station 100 according to a second example embodiment.

With reference to FIG. 8, a description will be given of an example of a configuration of a base station 100 according to the second example embodiment. FIG. 8 is a block diagram illustrating an example of a schematic configuration of the base station 100 according to the second example embodiment. With reference to FIG. 8, the base station 100 includes a wireless communication section 310, a storage section 320, and a processing section 330.

(1) Wireless Communication Section 310

The wireless communication section 310 wirelessly transmits and/or receives a signal. For example, the wireless communication section 310 receives a signal from a terminal apparatus and transmits a signal to the terminal apparatus.

(2) Storage Section 320

The storage section 320 temporarily or permanently stores programs and parameters for operations of the base station 100 as well as various data.

(3) Processing Section 330

The processing section 330 provides various functions of the base station 100. The processing section 330 includes an information obtaining section 331, a first transmission processing section 333, a beam selecting section 335, and a second transmission processing section 337. Note that the processing section 330 may further include constituent elements other than these constituent elements. In other words, the processing section 330 may also perform operations other than the operations of these constituent elements. Concrete operations of the information obtaining section 331, the first transmission processing section 333, the beam selecting section 335, and the second transmission processing section 337 will be described later in detail.

For example, the processing section 330 (second transmission processing section 337) transmits a signal to a terminal apparatus (e.g., the terminal apparatus 200) through a transmit beam via the wireless communication section 310.

(4) Implementation Example

The wireless communication section 310 may be implemented with a directional antenna, a radio frequency (RF) circuit, and the like. The storage section 320 may be implemented with a memory (e.g., a nonvolatile memory and/or a volatile memory) and/or a hard disk, and the like. The processing section 330 may be implemented with a baseband (BB) processor and/or a different processor, and the like. The information obtaining section 331, the first transmission processing section 333, the beam selecting section 335, and the second transmission processing section 337 may be implemented with the same processor or may be implemented with separate processors. The memory (storage section 320) may be included in such a processor (chip).

The base station 100 may include a memory configured to store a program and one or more processors that can execute the program, and the one or more processors may perform operations of the processing section 330 (operations of the information obtaining section 331, the first transmission processing section 333, the beam selecting section 335, and the second transmission processing section 337). The program may be a program for causing the processor(s) to perform operations of the processing section 330 (operations of the information obtaining section 331, the first transmission processing section 333, the beam selecting section 335, and the second transmission processing section 337).

<5.2. Configuration of Terminal Apparatus>

Figure 9:
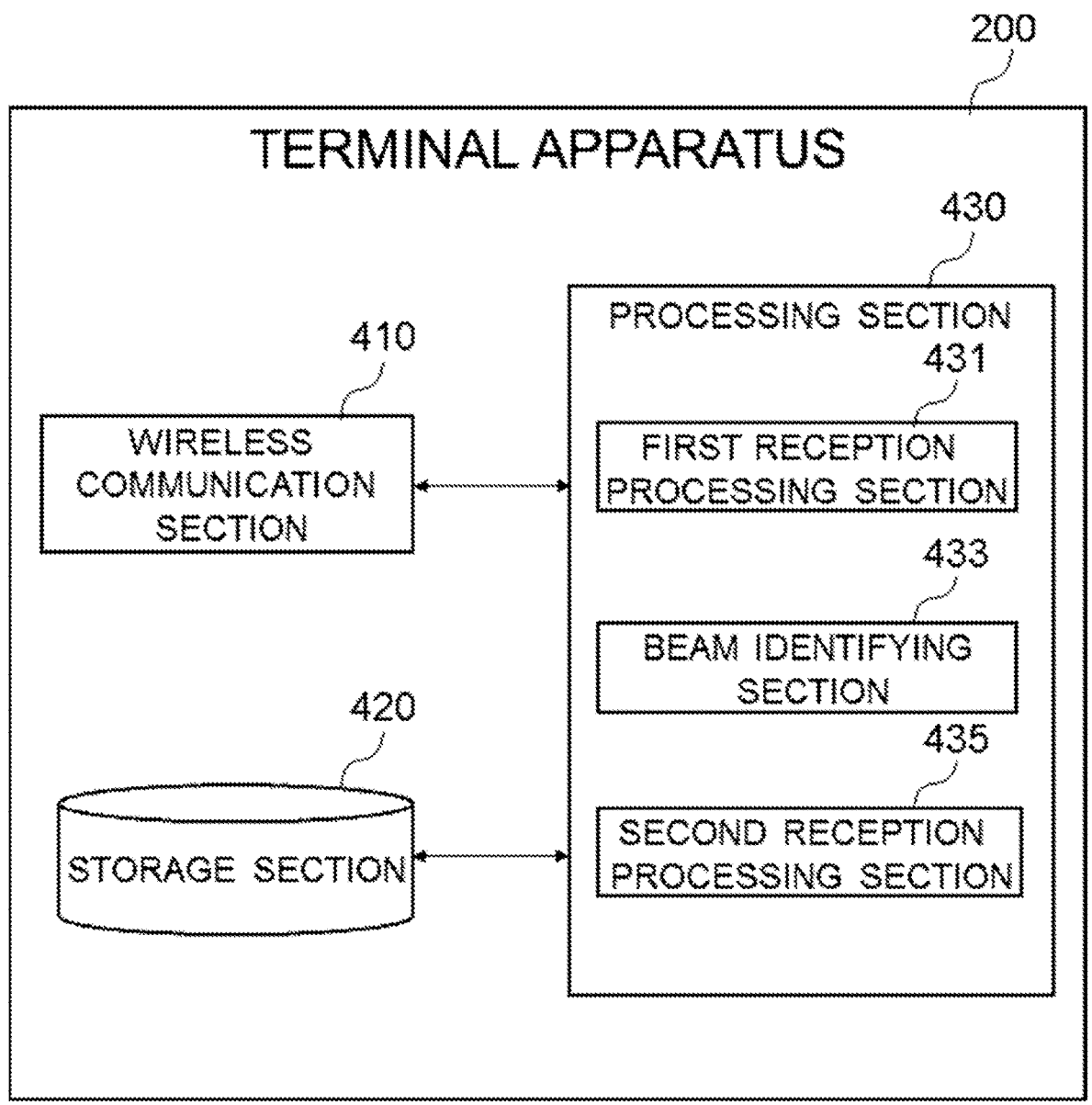
FIG. 9 is a block diagram illustrating an example of a schematic configuration of a terminal apparatus 200 according to the second example embodiment.

Next, with reference to FIG. 9, an example of a configuration of a terminal apparatus 200 according to the second example embodiment will be described. FIG. 9 is a block diagram illustrating an example of a schematic configuration of the terminal apparatus 200 according to the second example embodiment. With reference to FIG. 9, the terminal apparatus 200 includes a wireless communication section 410, a storage section 420, and a processing section 430.

(1) Wireless Communication Section 410

The wireless communication section 410 wirelessly transmits and/or receives a signal. For example, the wireless communication section 410 receives a signal from the base station 100 and transmits a signal to the base station 100.

(2) Storage Section 420

The storage section 420 temporarily or permanently stores programs and parameters for operations of the terminal apparatus 200 as well as various data.

(3) Processing Section 430

The processing section 430 provides various functions of the terminal apparatus 200. The processing section 430 includes a first reception processing section 431, a beam identifying section 433, and a second reception processing section 435. Note that the processing section 430 may further include constituent elements other than these constituent elements. In other words, the processing section 430 may also perform operations other than the operations of these constituent elements. Concrete operations of the first reception processing section 431, the beam identifying section 433, and the second reception processing section 435 will be described later in detail.

For example, the processing section 430 (first reception processing section 431) receives, via the wireless communication section 410, a signal transmitted from the base station 100 to the terminal apparatus 200 through a transmit beam.

(4) Implementation Example

The wireless communication section 410 may be implemented with an antenna, a radio frequency (RF) circuit, and the like. The storage section 420 may be implemented with a memory (e.g., a nonvolatile memory and/or a volatile memory) and/or a hard disk, and the like. The processing section 430 may be implemented with a baseband (BB) processor and/or a different processor, and the like. The first reception processing section 431, the beam identifying section 433, and the second reception processing section 435 may be implemented with the same processor or may be implemented with separate processors. The memory (storage section 420) may be included in such a processor (chip).

The terminal apparatus 200 may include a memory configured to store a program and one or more processors that can execute the program, and the one or more processors may perform operations of the processing section 430 (operations of the first reception processing section 431, the beam identifying section 433, and the second reception processing section 435). The program may be a program for causing the processor(s) to perform operations of the processing section 430 (operations of the first reception processing section 431, the beam identifying section 433, and the second reception processing section 435).

<5.3. Technical Features>

Next, technical features of the second example embodiment will be described.

Base Station

The base station 100 (information obtaining section 331) obtains indication information indicating use of one transmit beam selection technique out of a plurality of transmit beam selection techniques for selecting a transmit beam for transmitting a signal to the terminal apparatus 200. The base station 100 (first transmission processing section 333) then transmits the indication information to the terminal apparatus 200. The base station 100 (beam selecting section 335) further selects a transmit beam, based on the indication information. Subsequently, the base station 100 (second transmission processing section 337) transmits a signal to the terminal apparatus 200 through the selected transmit beam.

Terminal Apparatus

The terminal apparatus 200 (first reception processing section 431) obtains, from the base station 100, the indication information indicating use of one transmit beam selection technique out of a plurality of transmit beam selection techniques for selecting a transmit beam for transmitting a signal to the terminal apparatus 200. The terminal apparatus 200 (beam identifying section 433) then identifies a transmit beam, based on the indication information. The terminal apparatus 200 (second reception processing section 435) further adjusts a receive beam so that reception quality for the transmit beam selected by the base station 100 would be optimal, and receives a signal transmitted from the base station 100.

(1) Indication Information

As described above, the indication information is information indicating use of one transmit beam selection technique out of the plurality of transmit beam selection techniques.

Beam Selection Technique

For example, the plurality of transmit beam selection techniques include, for example, a first transmit beam selection technique and a second transmit beam selection technique. For example, the one transmit beam selection technique is the first transmit beam selection technique or the second transmit beam selection technique.

The first transmit beam selection technique is a beam selection technique similar to that in the first example embodiment, specifically, a technique for selecting a transmit beam for transmission to the terminal apparatus 200 from among the plurality of candidate transmit beams, based on the obtainable information obtainable for both the base station 100 and the terminal apparatus 200, the obtainable information being neither communication quality information nor an identifier indicating a transmit beam for transmission to the terminal apparatus 200.

The second transmit beam selection technique is a technique for selecting a transmit beam having the highest reception quality (referred to also as a best beam, below), based on a result of measurement by the terminal apparatus 200. In the second transmit beam selection technique, the reception quality based on the result of measurement by the terminal apparatus 200 is shared in advance between the base station 100 and the terminal apparatus 200, to thereby select and identify the transmit beam having the highest reception quality.

Concrete Example of Indication Information

For example, the indication information is information indicating the one transmit beam selection technique. As an example, the indication information is 1-bit information. When the indication information is 0, this indicates one of the first transmit beam selection technique and the second transmit beam selection technique; when the indication information is 1, this indicates the other of the first transmit beam selection technique and the second transmit beam selection technique.

Alternatively, the indication information may be information indicating switching to the one transmit beam selection technique from the other transmit beam selection technique from among the plurality of transmit beam selection techniques. As an example, the indication information may be 1-bit information. When the indication information is 0, this may indicate that the transmit beam selection technique is not switched to the one transmit beam selection technique; when the indication information is 1, this may indicate that the transmit beam selection technique is switched to the one transmit beam selection technique.

Technique for Transmitting Indication Information

The base station 100 (first transmission processing section 333) transmits downlink control information including resource allocation information for the terminal apparatus 200 and the indication information. For example, the indication information is 1-bit information. In particular, using 1-bit information as the indication information can notify the terminal apparatus 200 of which beam selection technique is to be used while suppressing the overhead of the downlink control information from increasing. Note that the indication information is not limited to downlink control information and may be transmitted in a MAC control element, an RRC message, or the like.

(2) Flow of Processing

Base Station

Figure 10:
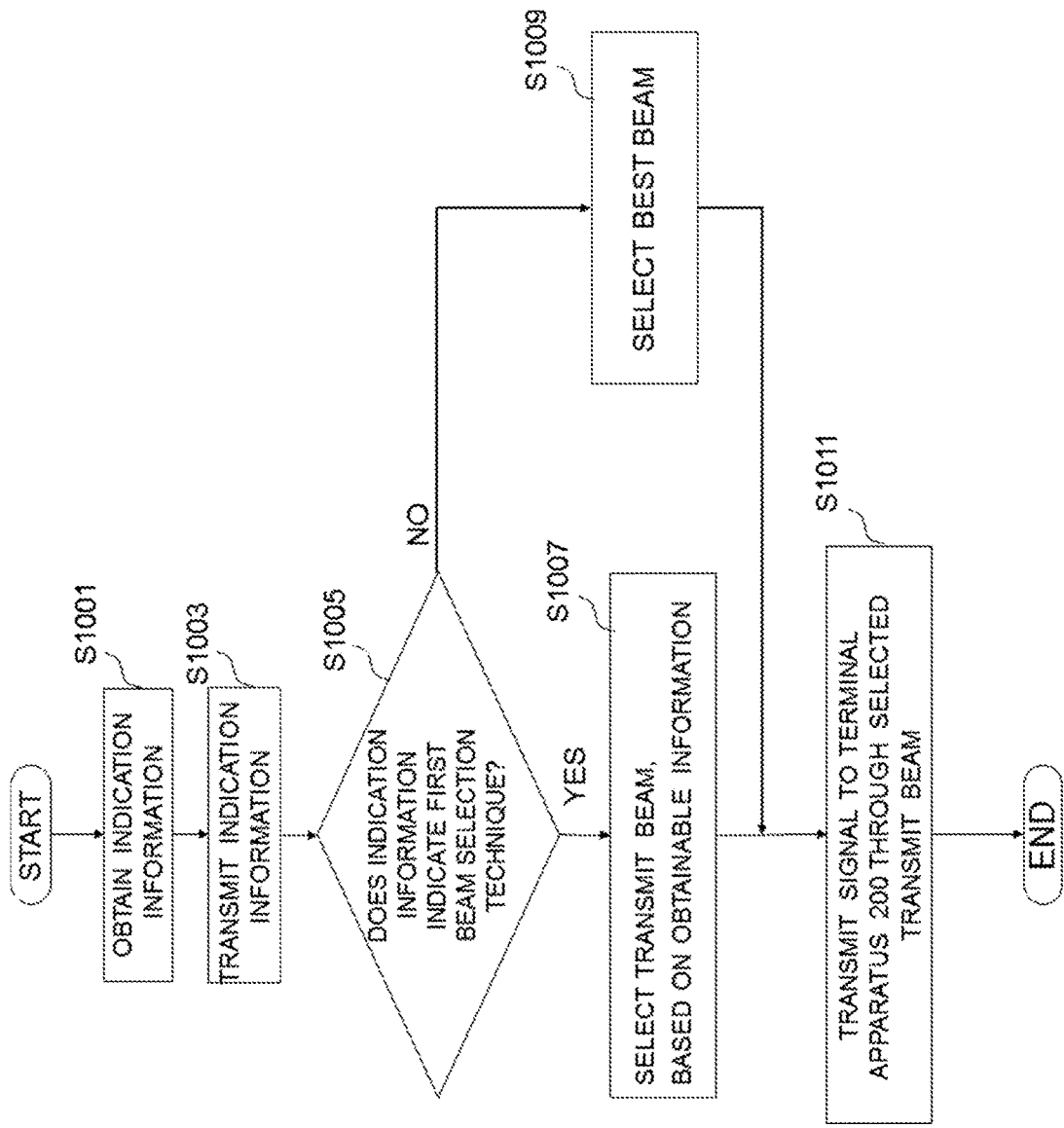
FIG. 10 is a flowchart for describing an example of a schematic flow of processing in the base station 100 according to the second example embodiment.

FIG. 10 is a flowchart for describing an example of a schematic flow of processing in the base station 100 according to the second example embodiment.

The base station 100 (information obtaining section 331) obtains indication information indicating a transmit beam selection technique out of the first transmit beam selection technique and the second transmit beam selection technique (S1001). The base station 100 (first transmission processing section 333) then transmits the indication information to the terminal apparatus 200 (S1003).

Subsequently, the base station 100 (beam selecting section 335) determines whether or not the indication information indicates the first beam selection technique or not (S1005). Here, when the indication information indicates the first beam selection technique (S1005: YES), the base station 100 (beam selecting section 335) selects a transmit beam, based on the obtainable information (S1007). In contrast, when the indication information does not indicate the first beam selection technique, in other words, indicates the second beam selection technique (S1005: NO), the base station 100 (beam selecting section 335) selects the best beam as a transmit beam (S1009).

The base station 100 (second transmission processing section 337) then transmits a signal to the terminal apparatus 200 through the selected transmit beam (S1011).

Terminal Apparatus

Figure 11:
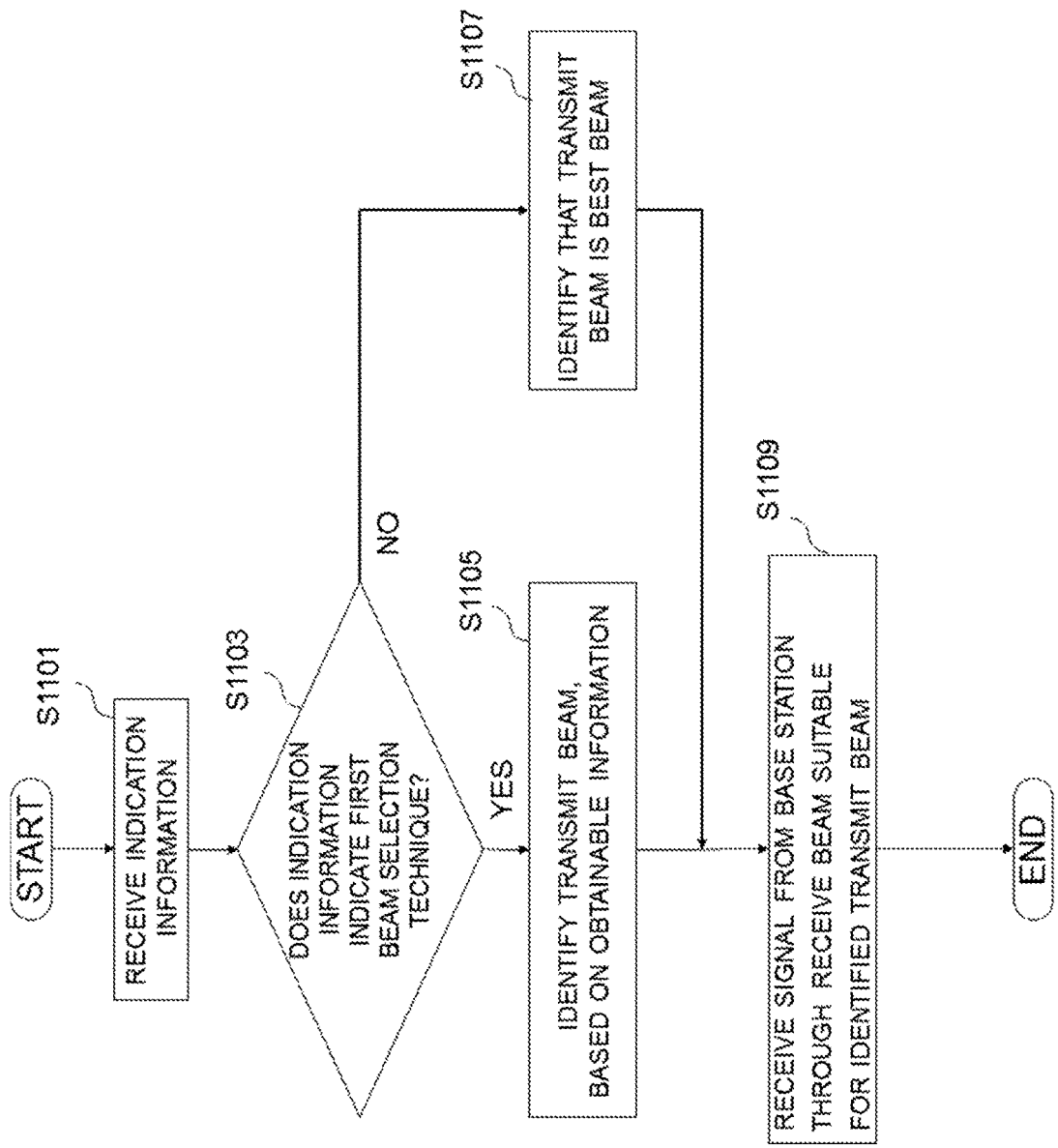
FIG. 11 is a flowchart for describing an example of a schematic flow of processing in the terminal apparatus 200 according to the second example embodiment.

FIG. 11 is a flowchart for describing an example of a schematic flow of processing in the terminal apparatus 200 according to the second example embodiment.

The terminal apparatus 200 (first reception processing section 431) receives, from the base station 100, indication information indicating a transmit beam selection technique out of the first transmit beam selection technique and the second transmit beam selection technique (S1101).

Subsequently, the terminal apparatus 200 (beam identifying section 433) determines whether or not the indication information indicates the first beam selection technique (S1103). Here, when the indication information indicates the first beam selection technique (S1103: YES), the terminal apparatus 200 (beam identifying section 433) identifies a transmit beam, based on the obtainable information (S1105). In contrast, when the indication information does not indicate the first beam selection technique, in other words, the second beam selection technique (S1103: NO), the terminal apparatus 200 (beam identifying section 433) identifies that the transmit beam is the best beam (S1107).

The terminal apparatus 200 (second reception processing section 435) then receives a signal from the base station 100 through a receive beam suitable for the identified transmit beam (S1109).

Through the processing illustrated in FIG. 10 and FIG. 11 described above, it is possible to notify the terminal apparatus 200 of a beam selection technique to be used for selecting a transmit beam, based on the indication information, while reducing radio resource use.

6. Third Example Embodiment

Next, a description will be given of a third example embodiment of the present invention with reference to FIG.

Figure 13:
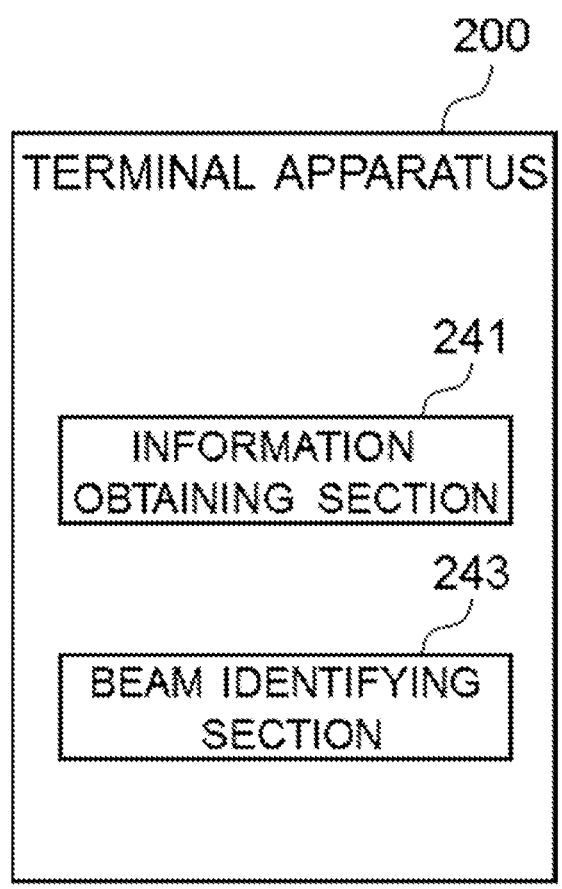
FIG. 13 is a block diagram illustrating an example of a schematic configuration of a terminal apparatus 200 according to the third example embodiment.

12 and FIG. 13. The above-described first example embodiment is a concrete example embodiment, whereas the third example embodiment is a more generalized example embodiment.

<6.1. Configuration of Base Station>

Figure 12:
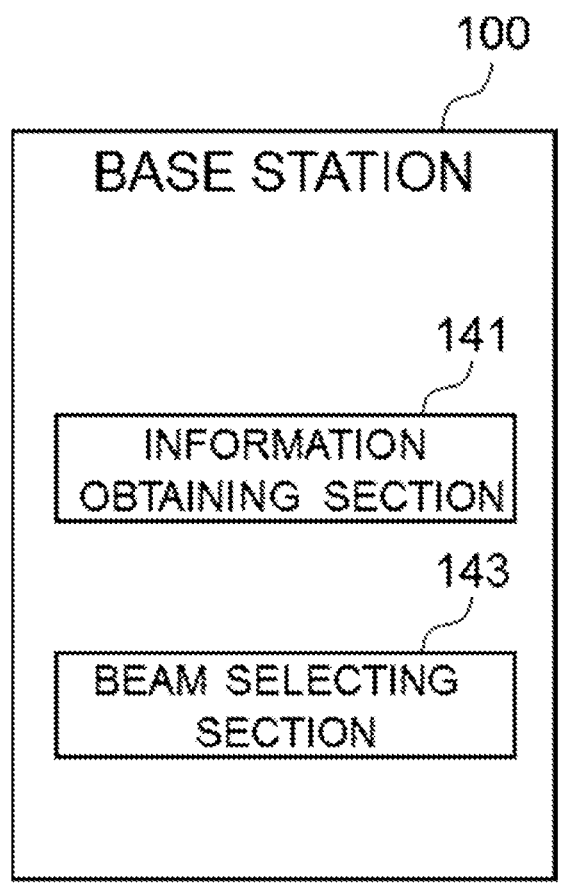
FIG. 12 is a block diagram illustrating an example of a schematic configuration of a base station 100 according to a third example embodiment.

An example of a configuration of a base station 100 according to the third example embodiment will be described with reference to FIG. 12. FIG. 12 is a block diagram illustrating an example of a schematic configuration of the base station 100 according to the third example embodiment. With reference to FIG. 12, the base station 100 includes an information obtaining section 141 and a beam selecting section 143.

Concrete operations of the information obtaining section 141 and the beam selecting section 143 will be described later.

The information obtaining section 141 and the beam selecting section 143 may be implemented with a baseband (BB) processor and/or a different processor, and the like. The information obtaining section 141 and the beam selecting section 143 may be implemented with the same processor or may be implemented with separate processors.

The base station 100 may include a memory configured to store a program and one or more processors that can execute the program, and the one or more processors may perform operations of the information obtaining section 141 and the beam selecting section 143. The program may be a program for causing the one or more processors to perform the operations of the information obtaining section 141 and the beam selecting section 143.

<6.2. Configuration of Terminal Apparatus>

With reference to FIG. 13, an example of a configuration of a terminal apparatus 200 according to the third example embodiment will be described. FIG. 13 is a block diagram illustrating an example of a schematic configuration of the terminal apparatus 200 according to the third example embodiment. With reference to FIG. 13, the terminal apparatus 200 includes an information obtaining section 241 and a beam identifying section 243.

Concrete operations of the information obtaining section 241 and the beam identifying section 243 will be described later.

The information obtaining section 241 and the beam identifying section 243 may be implemented with a baseband (BB) processor and/or a different processor, and the like. The information obtaining section 241 and the beam identifying section 243 may be implemented with the same processor or may be implemented with separate processors.

The terminal apparatus 200 may include a memory configured to store a program and one or more processors that can execute the program, and the one or more processors may perform operations of the information obtaining section 241 and the beam identifying section 243. The program may be a program for causing the one or more processors to perform the operations of the information obtaining section 241 and the beam identifying section 243.

<6.3. Technical Features>

Next, technical features of the third example embodiment will be described. The above-described first example embodiment is a concrete example embodiment, whereas the third example embodiment is a more generalized example embodiment.

The base station 100 (information obtaining section 141) obtains obtainable information obtainable for both the base station 100 and the terminal apparatus 200, the obtainable information being neither communication quality information nor an identifier indicating a transmit beam for transmission to the terminal apparatus 200. The base station 100 (beam selecting section 143) then selects a transmit beam for transmission to the terminal apparatus 200 from among a plurality of candidate transmit beams, based on the obtainable information.

The terminal apparatus 200 (information obtaining section 241) obtains obtainable information obtainable for both the base station 100 and the terminal apparatus 200, the obtainable information being neither communication quality information nor an identifier indicating a transmit beam for transmission to the terminal apparatus 200. The terminal apparatus 200 (beam identifying section 243) then identifies the transmit beam for transmission to the terminal apparatus 200, the transmit beam being selected by the base station 100, from among the plurality of candidate transmit beams, based on the obtainable information.

In the above-described way, the base station 100 can select a transmit beam and the terminal apparatus 200 can identify the transmit beam, based on the obtainable information. In other words, this enables the terminal apparatus 200 to identify the transmit beam to be used by the base station 100 while reducing radio resource use.

7. Fourth Example Embodiment

Next, a fourth example embodiment will be described. The above-described second example embodiment is a concrete example embodiment, whereas the fourth example embodiment is a more generalized example embodiment.

<7.1. Configuration of Base Station>

Figure 14:
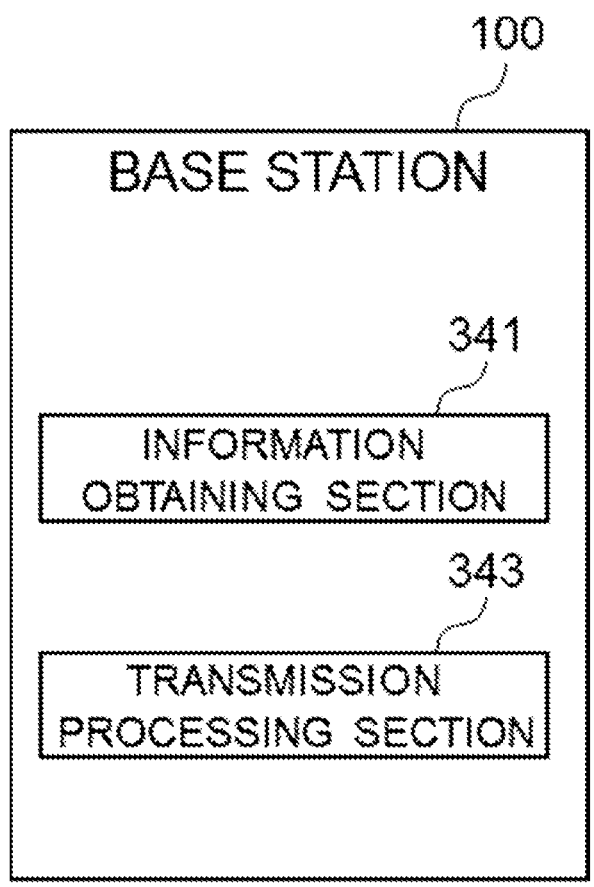
FIG. 14 is a block diagram illustrating an example of a schematic configuration of a base station 100 according to a fourth example embodiment.

With reference to FIG. 14, a description will be given of an example of a configuration of the base station 100 according to the fourth example embodiment. FIG. 14 is a block diagram illustrating an example of a schematic configuration of the base station 100 according to the fourth example embodiment. With reference to FIG. 14, the base station 100 includes an information obtaining section 341 and a transmission processing section 343.

Concrete operations of the information obtaining section 341 and the transmission processing section 343 will be described later.

The information obtaining section 341 and the transmission processing section 343 may be implemented with a baseband (BB) processor and/or a different processor, and the like. The information obtaining section 341 and the transmission processing section 343 may be implemented with the same processor or may be implemented with separate processors.

The base station 100 may include a memory configured to store a program and one or more processors that can execute the program, and the one or more processors may perform operations of the information obtaining section 341 and the transmission processing section 343. The program may be a program for causing the one or more processors to perform the operations of the information obtaining section 341 and the transmission processing section 343.

<7.2. Configuration of Terminal Apparatus>

Figure 15:
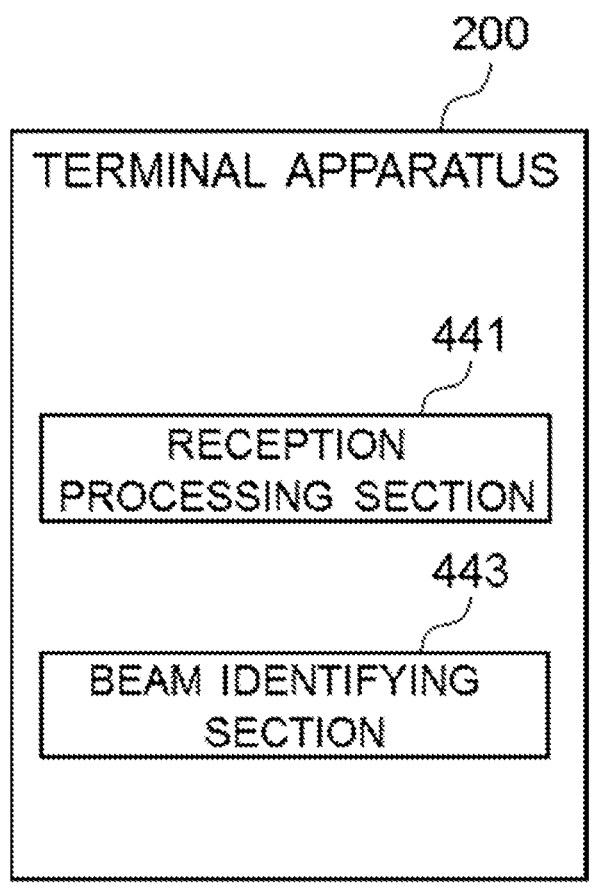
FIG. 15 is a block diagram illustrating an example of a schematic configuration of a terminal apparatus 200 according to the fourth example embodiment.

With reference to FIG. 15, an example of a configuration of a terminal apparatus 200 according to the fourth example embodiment will be described. FIG. 15 is a block diagram illustrating an example of a schematic configuration of the terminal apparatus 200 according to the fourth example embodiment. With reference to FIG. 15, the terminal apparatus 200 includes a reception processing section 441 and a beam identifying section 443.

Concrete operations of reception processing section 441 and the beam identifying section 443 will be described later.

The reception processing section 441 and the beam identifying section 443 may be implemented with a baseband (BB) processor and/or a different processor, and the like. The reception processing section 441 and the beam identifying section 443 may be implemented with the same processor or may be implemented with separate processors.

The terminal apparatus 200 may include a memory configured to store a program and one or more processors that can execute the program, and the one or more processors may perform operations of the reception processing section 441 and the beam identifying section 443. The program may be a program for causing the one or more processors to perform operations of the reception processing section 441 and the beam identifying section 443.

<7.3. Technical Features>

Next, technical features of the fourth example embodiment will be described.

The base station 100 (information obtaining section 341) obtains indication information indicating use of one transmit beam selection technique out of a plurality of transmit beam selection techniques for selecting a transmit beam for transmitting a signal to the terminal apparatus 200. The base station 100 (transmission processing section 343) then transmits the indication information to the terminal apparatus 200.

The terminal apparatus 200 (reception processing section 441) obtains, from the base station 100, the indication information indicating use of one transmit beam selection technique out of a plurality of transmit beam selection techniques for selecting a transmit beam for transmitting a signal to the terminal apparatus 200. The terminal apparatus 200 (beam identifying section 443) then identifies a transmit beam, based on the indication information.

In the above-described way, it is possible to notify the terminal apparatus 200 of a beam selection technique to be used for selecting a transmit beam, based on the indication information, while reducing radio resource use.

8. Other Example Aspects

Descriptions have been given above of the example embodiments of the present invention. However, the present invention is not limited to these example embodiments. It should be understood by those of ordinary skill in the art that these example embodiments are merely examples and that various alterations are possible without departing from the scope and the spirit of the present invention.

For example, selection and identification may be performed in a unit of a beam group including a plurality of transmit beams, without being limited to a single transmit beam, based on obtainable information obtainable for both the base station and the terminal apparatus, the obtainable information being neither communication quality information nor an identifier indicating a transmit beam for transmission to the terminal apparatus.

For example, the steps in the processing described in the Specification may not be necessarily performed in the order described in the corresponding flowchart in time series. For example, the steps in the processing may be performed in an order different from the order described in the flowchart or in parallel. In addition, some of the steps in the processing may be deleted, or more steps may be added to the processing.

Moreover, an apparatus including constituent elements of the base station described in the Specification (e.g., one or more apparatuses (or units) among a plurality of apparatuses (or units) constituting the base station or a module for one of the plurality of apparatuses (or units)) may be provided. An apparatus including the constituent elements of the terminal apparatus described in the Specification (e.g., a module for the terminal apparatus) may be provided. Moreover, methods including processing of the constituent elements may be provided, and programs for causing a processor to execute processing of the constituent elements may be provided. Moreover, non-transitory computer-readable recording media (non-transitory computer readable media) recording the programs may be provided. It is apparent that such apparatuses, methods, programs, and non-transitory computer-readable recording media are also included in the present invention.

The whole or part of the example embodiments disclosed above can be described as, but not limited to, the following supplementary notes.

(Supplementary Note 1)

A base station comprising:

an information obtaining section configured to obtain obtainable information obtainable for both the base station and a terminal apparatus, the obtainable information being neither communication quality information nor an identifier indicating a transmit beam for transmission to the terminal apparatus; and a beam selecting section configured to select a transmit beam for transmission to the terminal apparatus, from among a plurality of candidate transmit beams, based on the obtainable information.

(Supplementary Note 2)

The base station according to Supplementary Note 1, wherein the obtainable information includes common information common to terminal apparatuses.

(Supplementary Note 3)

The base station according to Supplementary Note 2, wherein the common information includes time information indicating time.

(Supplementary Note 4)

The base station according to Supplementary Note 3, wherein the time information includes at least one of a system frame number, a subframe number, a slot number, and a mini-slot number.

(Supplementary Note 5)

The base station according to any one of Supplementary Notes 1 to 4, wherein the obtainable information includes information specific to the terminal apparatus.

(Supplementary Note 6)

The base station according to Supplementary Note 5, wherein the information specific to the terminal apparatus includes resource information related to radio resource to be used for transmission to the terminal apparatus.

(Supplementary Note 7)

The base station according to Supplementary Note 6, wherein the radio resource is radio resource of a control channel to be used for transmission of control information to the terminal apparatus or radio resource of a data channel to be used for transmission of data to the terminal apparatus.

(Supplementary Note 8)

The base station according to Supplementary Note 7, wherein the control channel is physical downlink control channel (PDCCH), and the data channel is physical downlink shared channel (PDSCH).

(Supplementary Note 9)

The base station according to any one of Supplementary Notes 6 to 8, wherein the resource information includes at least one of a control channel element (CCE) start index, a physical resource block (PRB) start number, and an orthogonal frequency division multiplexing (OFDM) symbol number.

(Supplementary Note 10)

The base station according to any one of Supplementary Notes 5 to 9, wherein the information specific to the terminal apparatus includes identification information of a retransmission control process to be used for transmission to the terminal apparatus.

(Supplementary Note 11)

The base station according to Supplementary Note 10, wherein the retransmission control process is a hybrid automatic repeat request (HARQ) process.

(Supplementary Note 12)

The base station according to any one of Supplementary Notes 5 to 11, wherein the information specific to the terminal apparatus is identification information of the terminal apparatus.

(Supplementary Note 13)

The base station according to Supplementary Note 12, wherein the identification information of the terminal apparatus is a radio network temporary identifier (RNTI) of the terminal apparatus.

(Supplementary Note 14)

The base station according to any one of Supplementary Notes 1 to 13, wherein the obtainable information includes an offset value, and the beam selecting section selects the transmit beam from among the plurality of candidate transmit beams, based on the offset value and identification information of a transmit beam selected in past.

(Supplementary Note 15)

The base station according to any one of Supplementary Notes 1 to 14, further comprising a first transmission processing section configured to transmit, to the terminal apparatus, first indication information indicating that the base station selects the transmit beam, based on the obtainable information.

(Supplementary Note 16)

The base station according to Supplementary Note 15, wherein the first transmission processing section is configured to transmit downlink control information including resource allocation information for the terminal apparatus and the first indication information.

(Supplementary Note 17)

The base station according to Supplementary Note 15 or 16, wherein the first indication information is 1-bit information.

(Supplementary Note 18)

The base station according to any one of Supplementary Notes 1 to 17, wherein the beam selecting section is configured to cyclically select the transmit beam, based on the obtainable information.

(Supplementary Note 19)

The base station according to Supplementary Note 18, further comprising a second transmission processing section configured to transmit, to the terminal apparatus, cycle information indicating a cycle for selecting the transmit beam, based on the obtainable information.

(Supplementary Note 20)

The base station according to any one of Supplementary Notes 1 to 17, wherein the beam selecting section is configured to select the transmit beam, based on the obtainable information every time the obtainable information is changed.

(Supplementary Note 21)

The base station according to any one of Supplementary Notes 1 to 17, wherein the beam selecting section is configured to select the transmit beam, based on the obtainable information every time notification information from the terminal apparatus is received.

(Supplementary Note 22)

The base station according to any one of Supplementary Notes 1 to 21, wherein the transmit beam is a transmit beam for transmission on a data channel to the terminal apparatus.

(Supplementary Note 23)

The base station according to any one of Supplementary Notes 1 to 22, further comprising a third transmission processing section configured to transmit, to the terminal apparatus, second indication information indicating a timing at which the base station selects the transmit beam, based on the obtainable information.

(Supplementary Note 24)

The base station according to any one of Supplementary Notes 1 to 23, further comprising a fourth transmission processing section configured to transmit, to the terminal apparatus, a signal through the selected transmit beam.

(Supplementary Note 25)

A terminal apparatus comprising:

an information obtaining section configured to obtain obtainable information obtainable for both a base station and the terminal apparatus, the obtainable information being neither communication quality information nor an identifier indicating a transmit beam for transmission to the terminal apparatus; and a beam identifying section configured to identify a transmit beam for transmission to the terminal apparatus, the transmit beam being selected by the base station, from among a plurality of candidate transmit beams, based on the obtainable information.

(Supplementary Note 26)

A method comprising:

obtaining obtainable information obtainable for both a base station and a terminal apparatus, the obtainable information being neither communication quality information nor an identifier indicating a transmit beam for transmission to the terminal apparatus; and selecting a transmit beam for transmission to the terminal apparatus, from among a plurality of candidate transmit beams, based on the obtainable information.

(Supplementary Note 27)

A method comprising:

obtaining obtainable information obtainable for both a base station and a terminal apparatus, the obtainable information being neither communication quality information nor an identifier indicating a transmit beam for transmission to the terminal apparatus; and identifying a transmit beam for transmission to the terminal apparatus, the transmit beam being selected by the base station, from among a plurality of candidate transmit beams, based on the obtainable information.

(Supplementary Note 28)

A program causing a processor to execute:

obtaining obtainable information obtainable for both a base station and a terminal apparatus, the obtainable information being neither communication quality information nor an identifier indicating a transmit beam for transmission to the terminal apparatus; and selecting a transmit beam for transmission to the terminal apparatus, from among a plurality of candidate transmit beams, based on the obtainable information.

(Supplementary Note 29)
A program causing a processor to execute:
obtaining obtainable information obtainable for both a base station and a terminal apparatus, the obtainable information being neither communication quality information nor an identifier indicating a transmit beam for transmission to the terminal apparatus; and
identifying a transmit beam for transmission to the terminal apparatus, the transmit beam being selected by the base station, from among a plurality of candidate transmit beams, based on the obtainable information.

(Supplementary Note 30)
A non-transitory computer-readable recording medium having recorded thereon a program causing a processor to execute:
obtaining obtainable information obtainable for both a base station and a terminal apparatus, the obtainable information being neither communication quality information nor an identifier indicating a transmit beam for transmission to the terminal apparatus; and
selecting a transmit beam for transmission to the terminal apparatus, from among a plurality of candidate transmit beams, based on the obtainable information.

(Supplementary Note 31)
A non-transitory computer-readable recording medium having recorded thereon a program causing a processor to execute:
obtaining obtainable information obtainable for both a base station and a terminal apparatus, the obtainable information being neither communication quality information nor an identifier indicating a transmit beam for transmission to the terminal apparatus; and
identifying a transmit beam for transmission to the terminal apparatus, the transmit beam being selected by the base station, from among a plurality of candidate transmit beams, based on the obtainable information.

(Supplementary Note 32)
A base station comprising:
an information obtaining section configured to obtain indication information indicating use of a transmit beam selection technique out of a plurality of transmit beam selection techniques for selecting a transmit beam for transmitting a signal to a terminal apparatus; and
a transmission processing section configured to transmit the indication information to the terminal apparatus.

(Supplementary Note 33)
A terminal apparatus comprising:
a reception processing section configured to receive, from a base station, indication information indicating use of a transmit beam selection technique out of a plurality of transmit beam selection techniques for the base station to select a transmit beam for transmitting a signal to the terminal apparatus; and
a beam selecting section configured to identify a transmit beam selected by the base station, based on the indication information.

(Supplementary Note 34)
A method comprising:
obtaining indication information indicating use of a transmit beam selection technique out of a plurality of transmit beam selection techniques for selecting a transmit beam for transmitting a signal to a terminal apparatus; and
transmitting the indication information to the terminal apparatus.

(Supplementary Note 35)
A method comprising:
receiving, from a base station, indication information indicating use of a transmit beam selection technique out of a plurality of transmit beam selection techniques for the base station to select a transmit beam for transmitting a signal to the terminal apparatus; and
identifying a transmit beam selected by the base station, based on the indication information.

(Supplementary Note 36)
A program causing a processor to execute:
obtaining indication information indicating use of a transmit beam selection technique out of a plurality of transmit beam selection techniques for selecting a transmit beam for transmitting a signal to a terminal apparatus; and
transmitting the indication information to the terminal apparatus.

(Supplementary Note 37)
A program causing a processor to execute:
receiving, from a base station, indication information indicating use of a transmit beam selection technique out of a plurality of transmit beam selection techniques for the base station to select a transmit beam for transmitting a signal to a terminal apparatus; and
identifying a transmit beam selected by the base station, based on the indication information.

(Supplementary Note 38)
A non-transitory computer-readable recording medium having recorded thereon a program causing a processor to execute:
obtaining indication information indicating use of a transmit beam selection technique out of a plurality of transmit beam selection techniques for selecting a transmit beam for transmitting a signal to a terminal apparatus; and
transmitting the indication information to the terminal apparatus.

(Supplementary Note 39)
A non-transitory computer-readable recording medium having recorded thereon a program causing a processor to execute:
receiving, from a base station, indication information indicating use of a transmit beam selection technique out of a plurality of transmit beam selection techniques for the base station to select a transmit beam for transmitting a signal to a terminal apparatus; and
identifying a transmit beam selected by the base station, based on the indication information.

This application claims priority based on JP 2017-000703 filed on Jan. 5, 2017, the entire disclosure of which is incorporated herein.

INDUSTRIAL APPLICABILITY

It is possible for a terminal apparatus to identify a beam to be used by a base station while reducing radio resource use, in a mobile communication system.

REFERENCE SIGNS LIST

1 System
10, 100 Base Station
131, 141, 231, 241, 331, 341 Information Obtaining Section
133, 143, 335 Beam Selecting Section
135, 333 First Transmission Processing section
137, 337 Second Transmission Processing Section
139, 411 Reception Processing Section
20, 200 Terminal Apparatus 233, 243, 433, 443 Beam Identifying Section
235, 431 First Reception Processing Section
237, 435 Second Reception Processing Section
239, 343 Transmission Processing Section

What is claimed is:

1. A base station comprising:
   at least one processor; and
   at least one memory coupled to the at least one processor, the at least one memory storing instructions that when executed by the at least one processor cause the at least one processor to:
      process first information and second information that are used by a terminal to identify a transmit beam from the base station for beam failure recovery, and
      transmit the first information to the terminal,
   wherein the second information comprises time information.

2. The base station according to claim 1, wherein the terminal uses the second information after using the first information to identify the transmit beam.

3. The base station according to claim 1, wherein the first information is indication information indicating that the base station selects the transmit beam.

4. The base station according to claim 1, wherein the at least one processor is further caused to: obtain the second information.

5. A method of a base station, the method comprising:
   processing first information and second information that are used by a terminal to identify a transmit beam from the base station for beam failure recovery, and
   transmitting the first information to the terminal,
   wherein the second information comprises time information.

6. The method according to claim 5, wherein the terminal uses the second information after using the first information to identify the transmit beam.

7. A terminal comprising:
   at least one processor; and
   at least one memory coupled to the at least one processor, the at least one memory storing instructions that when executed by the at least one processor cause the at least one processor to:
      obtain first information and second information for identifying a transmit beam from a base station; and
      identify the transmit beam based on the first information and the second information to perform beam failure recovery upon occurrence of beam failure,
   wherein the second information comprises time information.

8. The terminal according to claim 7, wherein the at least one processor is further caused to: use the second information after identification of the transmit beam using the first information.

9. The terminal according to claim 7, wherein the first information is indication information indicating that the base station selects the transmit beam.

10. A method of a terminal, the method comprising:
    obtaining first information and second information for identifying a transmit beam from a base station; and
    identifying the transmit beam based on the first information and the second information to perform beam failure recovery upon occurrence of beam failure,
    wherein the second information comprises time information.

11. The method according to claim 10, wherein the identifying comprises using the second information after using the first information to identify the transmit beam.

* * * * *